(12) United States Patent
Otaki et al.

(10) Patent No.: US 11,996,902 B2
(45) Date of Patent: May 28, 2024

(54) VEHICLE REMOTE INSTRUCTION SYSTEM

(71) Applicant: TOYOTA JIDOSHA KABUSHIKI KAISHA, Toyota (JP)

(72) Inventors: Sho Otaki, Yokohama (JP); Hiromitsu Urano, Numazu (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 0 days.

(21) Appl. No.: 18/330,067

(22) Filed: Jun. 6, 2023

(65) Prior Publication Data

US 2023/0318724 A1 Oct. 5, 2023

Related U.S. Application Data

(63) Continuation of application No. 16/991,336, filed on Aug. 12, 2020, now Pat. No. 11,716,160.

(30) Foreign Application Priority Data

Aug. 23, 2019 (JP) .................. 2019-152793

(51) Int. Cl.
*H04B 17/364* (2015.01)
*B60W 60/00* (2020.01)
*G05D 1/00* (2006.01)

(52) U.S. Cl.
CPC ......... *H04B 17/364* (2015.01); *B60W 60/001* (2020.02); *G05D 1/0011* (2013.01)

(58) Field of Classification Search
CPC . H04B 17/364; B60W 60/001; B60W 60/005; G05D 1/0011; G05D 2201/0213; G05D 1/0022
See application file for complete search history.

(56) References Cited

U.S. PATENT DOCUMENTS

| 9,465,388 | B1 | 10/2016 | Fairfield et al. | |
| 2009/0034479 | A1* | 2/2009 | Wakayama | H04L 45/16 370/332 |
| 2016/0232790 | A1* | 8/2016 | Massey | G08G 1/096716 |
| 2017/0293295 | A1 | 10/2017 | Tani | |
| 2018/0181118 | A1 | 6/2018 | Yoneda et al. | |

(Continued)

FOREIGN PATENT DOCUMENTS

| JP | 2010152834 A | 7/2010 |
| JP | 2016071585 A | 5/2016 |

(Continued)

*Primary Examiner* — Christine Ng
(74) *Attorney, Agent, or Firm* — Dinsmore & Shohl LLP

(57) ABSTRACT

A vehicle remote instruction system 100 transmits a remote instruction request from an autonomous driving vehicle 2 to a remote instruction apparatus 1, and controls travel of the autonomous driving vehicle 2 based on a remote instruction transmitted from the remote instruction apparatus 1 in response to the remote instruction request. The vehicle remote instruction system 100 includes a delay determination unit 39 configured to determine whether or not a communication delay occurs between the remote instruction apparatus 1 and the autonomous driving vehicle 2, and a rejection unit 40 configured to reject the remote instruction transmitted in response to the remote instruction request if it is determined by the delay determination unit 39 that the communication delay occurs.

6 Claims, 16 Drawing Sheets

(56) References Cited

U.S. PATENT DOCUMENTS

| | | |
|---|---|---|
| 2018/0231982 A1 | 8/2018 | Yunoki |
| 2019/0369637 A1* | 12/2019 | Shalev-Shwartz ............................ G01C 21/3415 |
| 2020/0031183 A1* | 1/2020 | Kim ...................... B60C 11/243 |
| 2020/0041994 A1* | 2/2020 | Alalao ................. G05D 1/0022 |
| 2020/0174481 A1* | 6/2020 | Van Heukelom ...... G06N 3/045 |
| 2020/0201319 A1* | 6/2020 | Gross .................. B60W 60/007 |
| 2020/0244558 A1* | 7/2020 | Palander ............. H04L 43/0852 |

FOREIGN PATENT DOCUMENTS

| | | |
|---|---|---|
| JP | 2018106676 A | 7/2018 |
| WO | 2017077621 A1 | 5/2017 |

* cited by examiner

VEHICLE REMOTE INSTRUCTION SYSTEM

CROSS-REFERENCE TO RELATED APPLICATION

This application is a continuation application of U.S. patent application Ser. No. 16/991,336 filed Aug. 12, 2020, which claims priority to Japanese Patent Application No. 2019-152793, filed Aug. 23, 2019, the entire contents of which are incorporated herein by reference.

TECHNICAL FIELD

The present disclosure relates to a vehicle remote instruction system that controls traveling of an autonomous driving vehicle based on a remote instruction transmitted from a remote instruction apparatus.

BACKGROUND

For example, Japanese Unexamined Patent Application Publication No. 2016-71585 discloses a vehicle remote instruction system that controls traveling of an autonomous driving vehicle by giving a remote instruction to an autonomous driving vehicle from a remote instruction apparatus. In this vehicle remote instruction system, if a communication delay occurs between the remote instruction apparatus and the autonomous driving vehicle, a driving control of the autonomous driving vehicle performed by receiving the remote instruction is switched to a safety control. In this safety control, a vehicle behavior for realizing the received remote instruction is different from that of a normal control.

SUMMARY

In the vehicle remote instruction system described in the document described above, if the communication delay occurs, a travel control of the autonomous driving vehicle is performed based on the remote instruction in a state in which the driving control is switched to the safety control. However, when the communication delay occurs, the content of the remote instruction from the remote instruction apparatus may not be appropriate from the beginning. Therefore, in the present technical field, it is desired to appropriately control the traveling of the autonomous driving vehicle even if a communication delay occurs between the remote instruction apparatus and the autonomous driving vehicle.

A vehicle remote instruction system according to an aspect of the present disclosure transmits a remote instruction request from an autonomous driving vehicle to a remote instruction apparatus, and controls travel of the autonomous driving vehicle based on a remote instruction transmitted from the remote instruction apparatus in response to the remote instruction request. The system includes: a delay determination unit configured to determine whether or not a communication delay occurs between the remote instruction apparatus and the autonomous driving vehicle; and a rejection unit configured to reject the remote instruction transmitted in response to the remote instruction request if it is determined by the delay determination unit that the communication delay occurs.

For example, if the communication delay occurs, when the autonomous driving vehicle receives the remote instruction, the surrounding situation has already changed, and the received remote instructions may become not appropriate. Therefore, in the vehicle remote instruction system, if it is determined that the communication delay occurs, the remote instruction transmitted in response to the remote instruction request is rejected. Accordingly, it is possible to suppress the travel of the autonomous driving vehicle from being controlled based on the inappropriate remote instruction. Therefore, even if the communication delay occurs between the remote instruction apparatus and the autonomous driving vehicle, the vehicle remote instruction system can appropriately control the travel of the autonomous driving vehicle by rejecting the remote instruction.

The vehicle remote instruction system may further includes: a transmission time acquisition unit configured to acquire an instruction transmission time, which is a time at which the remote instruction apparatus transmits the remote instruction; and a reception time acquisition unit configured to acquire an instruction reception time, which is a time at which the autonomous driving vehicle receives the remote instruction. The delay determination unit may be configured to determine that the communication delay occurs, if a difference between the instruction transmission time acquired by the transmission time acquisition unit and the instruction reception time acquired by the reception time acquisition unit is equal to or greater than a first threshold value. In this case, the vehicle remote instruction system can more appropriately determine whether or not the communication delay occurs, using the request transmission time and the instruction reception time.

The vehicle remote instruction system may further include: a request time acquisition unit configured to acquire a request transmission time that is a time at which the autonomous driving vehicle transmits the remote instruction request to the remote instruction apparatus; and a reception time acquisition unit configured to acquire an instruction reception time, which is a time at which the autonomous driving vehicle receives the remote instruction. The delay determination unit may be configured to determine that the communication delay occurs, if a difference between the instruction transmission time acquired by the transmission time acquisition unit and the instruction reception time acquired by the reception time acquisition unit is equal to or greater than a second threshold value. In this case, the vehicle remote instruction system can more appropriately determine whether or not the communication delay occurs, using the request transmission time and the instruction reception time.

The vehicle remote instruction system may further comprise: a transmission-time sensor information acquisition unit configured to acquire instruction transmission-time sensor information; and a reception-time sensor information acquisition unit configured to acquire instruction reception-time sensor information. The autonomous driving vehicle may be configured to include a sensor information transmission unit that transmits sensor information of a vehicle-mounted sensor that detects an external environment, to the remote instruction apparatus, the remote instruction apparatus may be configured to include a sensor information reception unit that receives the sensor information transmitted from the sensor information transmission unit, the transmission-time sensor information acquisition unit may be configured to acquire the sensor information received by the sensor information reception unit at the time when the remote instruction apparatus transmits the remote instruction, as the instruction transmission-time sensor information, the reception-time sensor information acquisition unit may be configured to acquire the sensor information detected by the vehicle-mounted sensor at the time when the autonomous driving vehicle receives the remote instruction, as the instruction reception-time sensor information, and the delay determination unit may be configured to determine whether the communication delay occurs or not based on the instruction transmission-time sensor information acquired by the transmission-time sensor information acquisition unit and the instruction reception-time sensor information acquired by the reception-time sensor information acquisition unit. In this case, the vehicle remote instruction system can more appropriately determine whether the communication delay occurs or not based on the instruction transmission-time sensor information and the instruction reception-time sensor information.

The vehicle remote instruction system may further includes: a request-time sensor information acquisition unit configured to acquire sensor information detected by a vehicle-mounted sensor that detects an external environment of the autonomous driving vehicle at the time when the autonomous driving vehicle transmits the remote instruction request, as instruction request-time sensor information; and a reception-time sensor information acquisition unit configured to acquire sensor information detected by the vehicle-mounted sensor at the time when the autonomous driving vehicle receives the remote instruction, as instruction reception-time sensor information. The delay determination unit may be configured to determine whether the communication delay occurs or not based on the instruction request-time sensor information acquired by the request-time sensor information acquisition unit and the instruction reception-time sensor information acquired by the reception-time sensor information acquisition unit. In this case, the vehicle remote instruction system can more appropriately determine whether the communication delay occurs or not based on the instruction request-time sensor information and the instruction reception-time sensor information.

According to an aspect of the present disclosure, it is possible to appropriately control the travel of the autonomous driving vehicle even if the communication delay occurs between the remote instruction apparatus and the autonomous driving vehicle.

DETAILED DESCRIPTION

Hereinafter, embodiments of the present disclosure will be described with reference to the drawings. In the description of the drawings, the same reference signs will be given to the same elements, and the descriptions thereof will not be repeated.

First Embodiment

Figure 1:
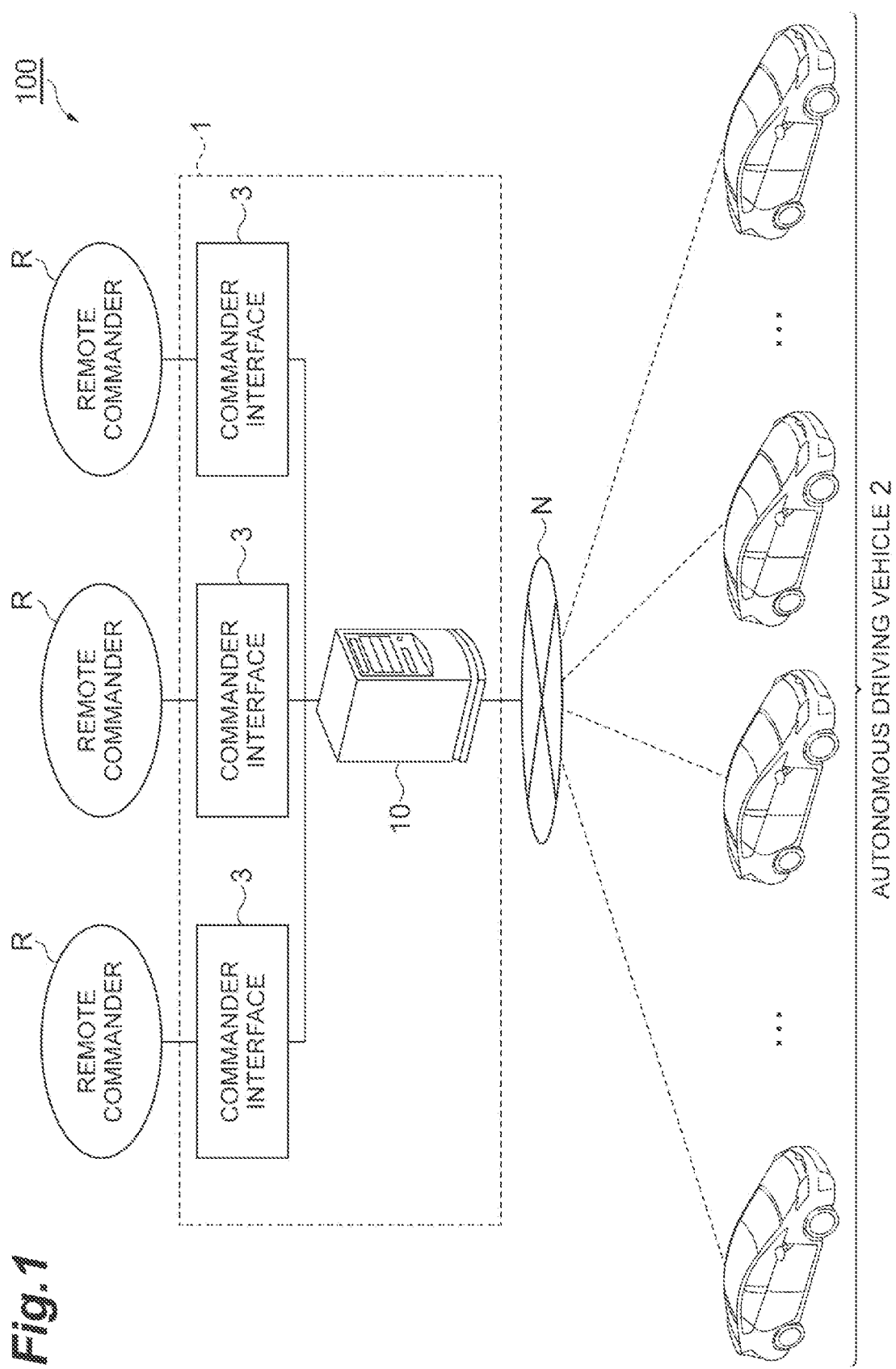
FIG. 1 is a diagram illustrating an overview of a vehicle remote instruction system according to a first embodiment.

A first embodiment of a vehicle remote instruction system will be described. FIG. 1 is a diagram illustrating an overview of a vehicle remote instruction system according to a first embodiment. A vehicle remote instruction system 100 illustrated in FIG. 1 is a system that performs a remote instruction to an autonomous driving vehicles 2 by a remote commander R. The remote instruction is an instruction from the remote commander R regarding the determination for travel of the autonomous driving vehicle 2.

The remote instruction may include at least one of an instruction for starting a right turn at an intersection, an instruction for starting an approach at an intersection with traffic signals, an instruction for starting an approach at an intersection with poor visibility, an instruction for starting a lane change. In a case of a country or a region of a vehicle's right-side traffic, it can be an instruction for starting a left turn at the intersection instead of the instruction for starting the right turn at the intersection. The intersection with poor visibility may be an intersection where it is difficult to visually recognize the situation of an intersecting road due to a wall or the like when approaching the intersection. The intersection with poor visibility is registered in advance in map information, for example. Whether or not the intersection with poor visibility may be determined according to an approaching direction of the autonomous driving vehicle 2 to the intersection.

Configuration of Vehicle Remote Instruction System

As illustrated in FIG. 1, the vehicle remote instruction system 100 includes a remote instruction apparatus 1 to which the remote commander R inputs a remote instruction. The remote instruction apparatus 1 is communicably connected to a plurality of autonomous driving vehicles 2 via a network N. The network N is a wireless communication network. Various information is sent to the remote instruction apparatus 1 from the autonomous driving vehicles 2.

In the vehicle remote instruction system 100, for example, the remote commander R is requested to input a remote instruction in response to a remote instruction request from the autonomous driving vehicle 2. The remote commander R inputs the remote instruction to a commander interface 3 of the remote instruction apparatus 1. The remote instruction apparatus 1 transmits the remote instruction to the autonomous driving vehicle 2 through the network N. As described above, the remote instruction apparatus 1 transmits the remote instruction in response to the remote instruction request from the autonomous driving vehicle 2. The autonomous driving vehicle 2 autonomously travels according to the remote instruction.

In the vehicle remote instruction system 100, the number of remote commanders R is not limited, and may be one or may be equal to or more than 2. The number of autonomous driving vehicles 2 that can communicate with the vehicle remote instruction system 100 is also not particularly limited. A plurality of remote commanders R may alternately perform the remote instruction for one autonomous driving vehicle 2 or one remote commander R may perform the remote instruction for two or more autonomous driving vehicles 2.

Configuration of Autonomous Driving Vehicle

Figure 2:
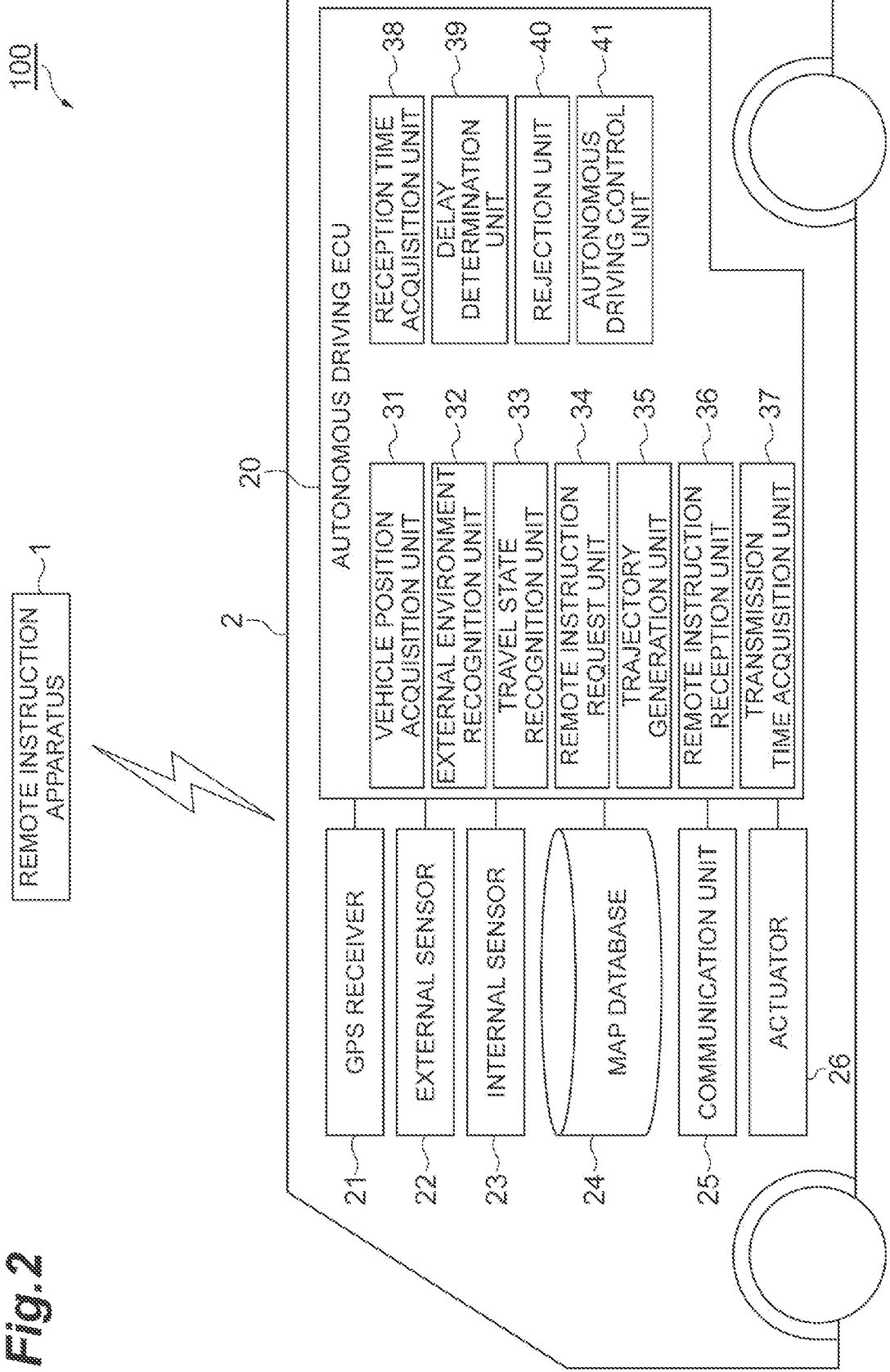
FIG. 2 is a block diagram illustrating an example of a configuration of an autonomous driving vehicle in the vehicle remote instruction system according to the first embodiment.

First, an example of the configuration of the autonomous driving vehicle 2 will be described. FIG. 2 is a block diagram illustrating an example of the configuration of the autonomous driving vehicle 2. As illustrated in FIG. 2, the autonomous driving vehicle 2 includes an autonomous driving ECU 20 as an example. The autonomous driving ECU 20 is an electronic control unit having a CPU, ROM, RAM, and the like. In the autonomous driving ECU 20, for example, various functions are realized by loading a program recorded in the ROM into the RAM and executing the program loaded in the RAM by the CPU. The autonomous driving ECU 20 may be configured with a plurality of electronic units.

The autonomous driving ECU 20 is connected to a global positioning system (GPS) receiver 21, an external sensor 22 (a vehicle-mounted sensor), an internal sensor (a sensor information transmission unit) 23, a map database 24, a communication unit 25, and an actuator 26.

The GPS receiver 21 measures a position of the autonomous driving vehicle 2 (for example, latitude and longitude of the autonomous driving vehicle 2) by receiving signals from equal to or more than three GPS satellites. The GPS receiver 21 transmits information on the measured position of the autonomous driving vehicle 2 to the autonomous driving ECU 20.

The external sensor 22 is a vehicle-mounted sensor that detects an external environment of the autonomous driving vehicle 2. The external sensor 22 transmits the detected detection information (sensor information) to the autonomous driving ECU 20. The external sensor 22 includes at least a camera. The camera is an imaging device that images the external environment of the autonomous driving vehicle 2. The camera is provided on the inside of a windshield of the autonomous driving vehicle 2 and images the front of the vehicle. The camera transmits detection information (imaging information) relating to the external environment of the autonomous driving vehicle 2 to the autonomous driving ECU 20. The camera may be a monocular camera or may be a stereo camera. A plurality of cameras may be provided, and may image the left and right sides and the rear side, in addition to the front of the autonomous driving vehicle 2. The autonomous driving vehicle 2 may be provided with an external camera for the remote commander. The external camera for the remote commander images at least the front of the autonomous driving vehicle 2. The external camera for the remote commander may be configured with a plurality of cameras that image the surroundings including the side and rear of the autonomous driving vehicle 2.

The external sensor 22 may include a radar sensor. The radar sensor is a detection device that detects an object around the autonomous driving vehicle 2 using radio waves (for example, millimeter waves) or light. The radar sensor includes, for example, millimeter wave radar or a light detection and ranging (LIDAR). The radar sensor transmits the radio wave or light to the surroundings of the autonomous driving vehicle 2, and detects the objects by receiving the radio waves or the light reflected from the objects. The radar sensor transmits the detected detection information (object information) to the autonomous driving ECU 20. The objects include fixed objects such as guardrails and buildings, and moving objects such as pedestrians, bicycles, other vehicles, and the like. In addition, the external sensor 22 may include a sound detection sensor that detects a sound outside the autonomous driving vehicle 2.

The internal sensor 23 is a vehicle-mounted sensor that detects a travel state of the autonomous driving vehicle 2. The internal sensor 23 includes a vehicle speed sensor, an accelerator sensor, and a yaw rate sensor. The vehicle speed sensor is a measurement device that measures a speed of the autonomous driving vehicle 2. As a vehicle speed sensor, for example, a vehicle wheel speed sensor is used, which is provided on vehicle wheels of the autonomous driving vehicle 2 or on a drive shaft rotating integrally with vehicle wheels, and measures a rotational speed of the vehicle wheels. The vehicle speed sensor transmits the measured vehicle speed information (vehicle wheel speed information) to the autonomous driving ECU 20.

The accelerator sensor is a measurement device that measures an acceleration of the autonomous driving vehicle 2. The accelerator sensor includes, for example, a longitudinal accelerator sensor that measures acceleration in the longitudinal direction of the autonomous driving vehicle 2 and the accelerator sensor may include a lateral accelerator sensor that measures a lateral acceleration of the autonomous driving vehicle 2. The accelerator sensor transmits, for example, acceleration information of the autonomous driving vehicle 2 to the autonomous driving ECU 20. The yaw rate sensor is a measurement device that measures a yaw rate (rotation angular velocity) around the vertical axis at the center of gravity of the autonomous driving vehicle 2. As the yaw rate sensor, for example, a Gyro sensor can be used. The yaw rate sensor transmits the measured yaw rate information of the autonomous driving vehicle 2 to the autonomous driving ECU 20.

The map database 24 is a database that records map information. The map database 24 is formed, for example, in a recording device such as a hard disk drive (HDD) mounted on the autonomous driving vehicle 2. The map information includes information on the position of the road, information on the shape of the road (for example, curvature information) and information on the position of the intersection and the branch. The map information may include traffic regulation information such as a legal speed associated with the position information. The map information may include target object information used for acquiring the position information of the autonomous driving vehicle 2. As the target object, road signs, road markings, traffic signals, utility poles, and the like can be used. The map database 24 may be configured as a server that can communicate with the autonomous driving vehicle 2. The server is not limited to the remote instruction server 10.

The communication unit 25 is a communication device that controls the wireless communication with the outside of the autonomous driving vehicle 2. The communication unit 25 transmits and receives various information to and from the remote instruction server 10 via the network N.

The actuator 26 is a device used for controlling the autonomous driving vehicle 2. The vehicle actuator 26 includes at least a drive actuator, a brake actuator and a steering actuator. The drive actuator controls a driving force of the autonomous driving vehicle 2 by controlling an amount of air (throttle opening degree) supplied to the engine according to a control signal from the autonomous driving ECU 20. If the autonomous driving vehicle 2 is a hybrid vehicle, in addition to the amount of air supplied to the engine, the control signal from the autonomous driving ECU 20 is input to a motor as a power source, and then, the driving force is controlled. If the autonomous driving vehicle 2 is an electric vehicle, the control signal from the autonomous driving ECU 20 is input to a motor as a power source, and then, the driving force of the vehicle V is controlled. The motor as the power source in these cases configures the vehicle actuator 26.

The brake actuator controls the brake system according to a control signal from the autonomous driving ECU 20 and controls a braking force applied to the vehicle wheels of the autonomous driving vehicle 2. For example, a hydraulic brake system can be used as the brake system. The steering actuator controls the driving of an assist motor controlling a steering torque of an electric power steering system according to a control signal from the autonomous driving ECU 20. In this way, the steering actuator controls the steering torque of the autonomous driving vehicle 2.

Next, a functional configuration of the autonomous driving ECU 20 will be described. The autonomous driving ECU 20 includes a vehicle position acquisition unit 31, an external environment recognition unit 32, a travel state recognition unit 33, a remote instruction request unit (sensor information transmission unit) 34, a trajectory generation unit 35, a remote instruction reception unit 36, a transmission time acquisition unit. 37, a reception time acquisition unit 38, a delay determination unit 39, a rejection unit 40, and an autonomous driving control unit 41.

The vehicle position acquisition unit 31 acquires position information of the autonomous driving vehicle 2 based on the position information from the GPS receiver 21 and the map information in the map database 24. In addition, the vehicle position acquisition unit 31 may acquire the position information of the autonomous driving vehicle 2 using the target object information included in the map information in the map database 24 and the result of detection performed by the external sensor 22 using the simultaneous localization and mapping (SLAM) technology. The vehicle position acquisition unit 31 may recognize a lateral position of the autonomous driving vehicle 2 relative to a lane (the position of the autonomous driving vehicle 2 in the lane width direction) from a position relationship between lane marking lines and the autonomous driving vehicle 2, and then, may include the lateral position in the position information. The vehicle position acquisition unit 31 may acquire the position information of the autonomous driving vehicle 2 using another known method.

The external environment recognition unit 32 recognizes the external environment of the autonomous driving vehicle 2 based on the result of detection performed by the external sensor 22. The external environment includes a relative position of surrounding objects relative to the autonomous driving vehicle 2. The external environment may include a relative speed and moving direction of the surrounding objects relative to the autonomous driving vehicle 2. The external environment may include types of the objects such as other vehicles, pedestrians, and bicycles. The types of the object can be identified by a known method such as pattern matching. The external environment may include a result of recognition of the marking lines (lane line recognition) around the autonomous driving vehicle 2. The external environment may include a result of recognition of a lighting state of a traffic signal. The external environment recognition unit 32 can recognize the lighting state of the traffic signal (the lighting state in which the vehicle can pass or the lighting state in which the vehicle is not allowed to pass) in front of the autonomous driving vehicle 2 based on, for example, the image from the camera of the external sensor 22.

The travel state recognition unit 33 recognizes the travel state of the autonomous driving vehicle 2 based on the result of detection performed by the internal sensor 23. The travel state includes the vehicle speed of autonomous driving vehicle 2, the acceleration of autonomous driving vehicle 2, and the yaw rate of autonomous driving vehicle 2. Specifically, the travel state recognition unit 33 recognizes the vehicle speed of the autonomous driving vehicle 2 based on the vehicle speed information from the vehicle speed sensor. The travel state recognition unit 33 recognizes the acceleration of the autonomous driving vehicle 2 based on the vehicle speed information from the accelerator sensor. The travel state recognition unit 33 recognizes the orientation of the autonomous driving vehicle 2 based on the yaw rate information from the yaw rate sensor.

The remote instruction request unit 34 determines whether a remote instruction request to the remote commander R is required or not. The remote instruction request unit 34 determines whether the remote instruction request is required or not based on at least one of the position information of the autonomous driving vehicle 2 acquired by the vehicle position acquisition unit 31 and the map information in the map database 24, the external environment recognized by the external environment recognition unit 32, and the trajectory generated by the trajectory generation unit 35 described later.

The remote instruction request unit 34 can determine that a remote instruction request is required, for example, when the autonomous driving vehicle 2 reaches a remote instruction requested location set in advance. The remote instruction requested location may be included in the map information stored in the map database 24, for example. The remote instruction request unit 34 can determine whether or not the vehicle has reached the remote instruction requested location based on the position information of the autonomous driving vehicle 2 and the map information (information on the remote instruction requested location).

If it is determined that the remote instruction request is required, the remote instruction request unit 34 requests the remote instruction apparatus 1 for the remote instruction by the remote commander R. The remote instruction request includes, for example, identification information on the autonomous driving vehicle 2. The remote instruction request unit 34 may perform the remote instruction request with a margin time in advance. When a distance between the remote instruction requested location (intersection or the like) subject to the remote instruction and the autonomous driving vehicle 2 is equal to or shorter than a certain distance, the remote instruction request unit 34 may determine that the remote instruction request is required. The remote instruction request unit 34 may use a remaining time for arrival instead of the distance.

When it is determined that the remote instruction request is required, the remote instruction request unit 34 transmits detection information (sensor information) of the external sensor 22 that detects the external environment, to the remote instruction apparatus 1. The detection information from the vehicle-mounted sensor includes an image by the camera of the external sensor 22. The detection information from the vehicle-mounted sensor may include, for example, an image in front of the autonomous driving vehicle 2 captured by the camera of the autonomous driving vehicle 2. The detection information from the vehicle-mounted sensor may include an image of surroundings of the autonomous driving vehicle 2 including the side and rear direction of the autonomous driving vehicle 2. The detection information from the vehicle-mounted sensor may include information on objects detected by the radar sensor of the external sensor 22. The detection information from the vehicle-mounted sensor may include a result of identification of the types of the objects.

The trajectory generation unit 35 generates a trajectory used for the autonomous driving of the autonomous driving vehicle 2. The trajectory generation unit 35 generates the autonomous driving trajectory based on a travel route set in advance, the map information, the position information of the autonomous driving vehicle 2, the external environment of the autonomous driving vehicle 2, and the travel state of the autonomous driving vehicle 2.

The travel route is a route on which the autonomous driving vehicle 2 travels in the autonomous driving. The trajectory generation unit 35 obtains the autonomous driving travel route based on, for example, a destination, the map information, and the position information of the autonomous driving vehicle 2. The travel route may be set by a known navigation system. The destination may be set by the occupant of the autonomous driving vehicle 2, or may be automatically proposed by the autonomous driving ECU 20 or the navigation system.

The trajectory includes a path on which the vehicle travels in autonomous driving and a vehicle speed profile in the autonomous driving. The path is a locus that the vehicle in the autonomous driving will travel on the travel route. For example, data on the change of the steering angle of the autonomous driving vehicle 2 according to the position on the travel route (steering angle profile) can be the path. The position on the travel route is, for example, a set longitudinal position set in each predetermined interval (for example, 1 m) in the traveling direction of the travel route. The steering angle profile is data in which a target steering angle is associated with each set longitudinal position.

The trajectory generation unit 35 generates the path on which the autonomous driving vehicle 2 will travel, based on, for example, the travel route, the map information, the external environment of the autonomous driving vehicle 2, and the travel state of the autonomous driving vehicle 2. The trajectory generation unit 35 generates the path such that, for example, the autonomous driving vehicle 2 passes through the center of the lane included in the travel route (the center in the lane width direction).

The vehicle speed profile is data in which a target vehicle speed is associated with each set longitudinal position, for example. The set longitudinal position may be set based on the traveling time of the autonomous driving vehicle 2 instead of the distance. The set longitudinal position may be set as an arrival position of the vehicle after 1 second or an arrival position of the vehicle after 2 seconds.

The trajectory generation unit 35 generates the vehicle speed profile based on traffic regulation information such as a legal speed included in the path and map information, for example. Instead of the legal speed, a legal speed set in advance for the position or the section on the map may be used. The trajectory generation unit 35 generates an autonomous driving trajectory from the path and the vehicle speed profile. The method of generating the trajectory by the trajectory generation unit 35 is not limited to the above-described content, and a well-known method regarding the autonomous driving can be adopted. The same applies to the contents of the trajectory.

In the present embodiment, when a remote instruction request is transmitted to the remote instruction apparatus 1 by the remote instruction request unit 34, the trajectory generation unit 35 generates a first trajectory and a second trajectory, for example. For example, the first trajectory is a trajectory that places more importance on safety than the second trajectory. In the present embodiment, as an example, the first trajectory is a trajectory in which the autonomous driving vehicle 2 is stopped when the autonomous driving vehicle 2 reaches the remote instruction requested location. For example, the second trajectory is a trajectory in which the efficiency of the travel of the autonomous driving vehicle 2 is more important than that in the first trajectory. The second trajectory is a trajectory corresponding to the remote instruction at the remote instruction requested location. In the present embodiment, as an example, the second trajectory is a trajectory in which the autonomous driving vehicle 2 travels on the remote instruction requested location based on the remote instruction from the remote instruction apparatus 1.

Specifically, the trajectory generation unit 35 generates a trajectory for the autonomous driving vehicle 2 to turn right at the intersection such that, for example, the autonomous driving vehicle 2 responses to the remote instruction to start the right turn in a situation of turning right at the intersection. The trajectory generation unit 35 may update the second trajectory according to the change in the external environment until the remote instruction is received. In addition, if the remote instruction to switch to go straight at the intersection from the right turn at the intersection is present, the trajectory generation unit 35 may generate the trajectory to go straight through the intersection.

The remote instruction reception unit 36 receives the remote instruction transmitted from the remote instruction apparatus 1 in response to the remote instruction request from the remote instruction request unit 34.

The transmission time acquisition unit 37 acquires an instruction transmission time, which is a time at which the remote instruction apparatus 1 transmitted the remote instruction. Specifically, the transmission time acquisition unit 37 acquires the instruction transmission time at which the remote instruction apparatus 1 performs the transmission, together with the remote instruction. The configuration in which the remote instruction apparatus 1 transmits the instruction transmission time together with the remote instruction will be described later in detail.

The reception time acquisition unit 38 acquires an instruction reception time, which is a time at which the autonomous driving vehicle 2 receives the remote instruction from the remote instruction apparatus 1. Specifically, the reception time acquisition unit 38 acquires the time at which the remote instruction reception unit 36 received the remote instruction from the remote instruction apparatus 1 as the instruction reception time.

Here, in the present embodiment, the time is used to determine whether a communication delay between the remote instruction apparatus 1 and the autonomous driving vehicle 2 is present or not. Therefore, it is necessary that the time used by each of the remote instruction apparatus 1 and the autonomous driving vehicle 2 is synchronized. For example, the remote instruction apparatus 1 and the autonomous driving vehicle 2 may use the GPS time used in the GPS in order to synchronize the time. However, the remote instruction apparatus 1 and the autonomous driving vehicle 2 are not limited to using the GPS time to synchronize the time. The remote instruction apparatus 1 and the autonomous driving vehicle 2 can synchronize time using various known methods. For example, the time may be synchronized by using a network time protocol (NTP) server for matching the time, which is installed in the remote instruction apparatus 1, the autonomous driving vehicle 2, or other places. In other embodiments described below, if the communication delay is determined using the time, it is possible to synchronize the time between the remote instruction apparatus and the autonomous driving vehicle using the same method as described above.

The delay determination unit 39 determines whether a communication delay occurs between the remote instruction apparatus 1 and the autonomous driving vehicle 2. As a cause of the communication delay here may include that, for example, the data may pass through a plurality of access points, servers, or base stations when the data is transmitted and received between the autonomous driving vehicle 2 and the remote instruction apparatus 1. In addition, the data transmitted from the autonomous driving vehicle 2 to the remote instruction apparatus 1 includes the detection information of the external sensor 22, but, the causes of the communication delay also include a fact that the data capacity of the detection information is large.

Specifically, the delay determination unit 39 determines whether or not the communication delay is present based on the difference between the instruction transmission time acquired by the transmission time acquisition unit 37 and the instruction reception time acquired by the reception time acquisition unit 38. Here, if the difference between the instruction transmission time at which the remote instruction was transmitted from the remote instruction apparatus 1 and the instruction reception time at which the remote instruction was received by the remote instruction reception unit 36 is equal to or greater than a first threshold, the delay determination unit 39 determines that the communication delay occurs. If the difference between the instruction transmission time and the instruction reception time is less than the first threshold, the delay determination unit 39 determines that the communication delay does not occurs.

The first threshold value may be determined based on, for example, whether or not it is permissible to control the travel of the autonomous driving vehicle 2 based on the remote instruction even if the remote instruction becomes temporally old due to the communication delay.

When it is determined by the delay determination unit 39 that the communication delay occurs, the rejection unit 40 rejects the remote instruction transmitted in response to the remote instruction request from the remote instruction apparatus 1. Here, "reject" means that the autonomous driving vehicle 2 does not follow the remote instruction transmitted in response to the remote instruction request.

When rejecting the remote instruction, the rejection unit 40 notifies the remote instruction apparatus 1 of the fact that the remote instruction is rejected, via the communication unit 25. The notification of the rejection received by the remote instruction apparatus 1 may be used for various kinds of processing such as statistical processing relating to the communication delay.

The autonomous driving control unit 41 performs the autonomous driving of the autonomous driving vehicle 2. The autonomous driving control unit 41 performs the autonomous driving of the autonomous driving vehicle 2 based on, for example, the external environment of the autonomous driving vehicle 2, the travel state of the autonomous driving vehicle 2, and the trajectory generated by the trajectory generation unit 35. The autonomous driving control unit 41 performs the autonomous driving of the autonomous driving vehicle 2 by transmitting a control signal to the actuator 26.

When the autonomous driving vehicle 2 reaches the remote instruction requested location, the autonomous driving control unit 41 stops the autonomous driving vehicle 2 based on the first trajectory. That is, when the remote instruction request is transmitted to the remote instruction apparatus 1 by the remote instruction request unit 34, the autonomous driving control unit 41 maintains the stopped state of the autonomous driving vehicle 2 until the remote instruction from the remote instruction apparatus 1 is received.

If the remote instruction is received, the autonomous driving control unit 41 switches the trajectory from the first trajectory to the second trajectory using the travel control, and starts performing the autonomous driving of the autonomous driving vehicle 2 based on the second trajectory. That is, the autonomous driving vehicle 2 is caused to start from the stopped state to start the right turn or the like.

However, when the remote instruction is received from the remote instruction apparatus 1 and when the remote instruction is rejected by the rejection unit 40, the autonomous driving control unit 41 maintains the first trajectory without perform the switching of the trajectory used for the travel control from the first trajectory to the second trajectory corresponding to the remote instruction. That is, the autonomous driving control unit 41 does not perform the traveling control according to the remote instruction. In this case, the autonomous driving control unit 41 may request the occupant of the autonomous driving vehicle 2 to make a determination regarding the traveling or to switch to the manual driving. In addition, if the determination or the manual driving by the occupant is not possible, the autonomous driving control unit 41 may perform the emergency evacuation autonomously. If the travel control (switching of the trajectory) based on the remote instruction is not performed, the autonomous driving control unit 41 may adopt various controls other than the control based on the remote instruction as the travel control of the autonomous driving vehicle 2.

If the remote instruction cannot be received even after a time set in advance has elapsed, the autonomous driving control unit 41 may request the occupant of the autonomous driving vehicle 2 to make the determination regarding the traveling or to switch to the manual driving. In addition, if the determination or the manual driving by the occupant is not possible, the autonomous driving control unit 41 may perform the emergency evacuation autonomously.

Configuration of Remote Instruction Apparatus

Hereinafter, a configuration of the remote instruction apparatus 1 according to the present embodiment will be described with reference to the drawings. As illustrated in FIG. 1, the remote instruction apparatus 1 includes a remote instruction server 10 and commander interfaces 3.

Figure 3:
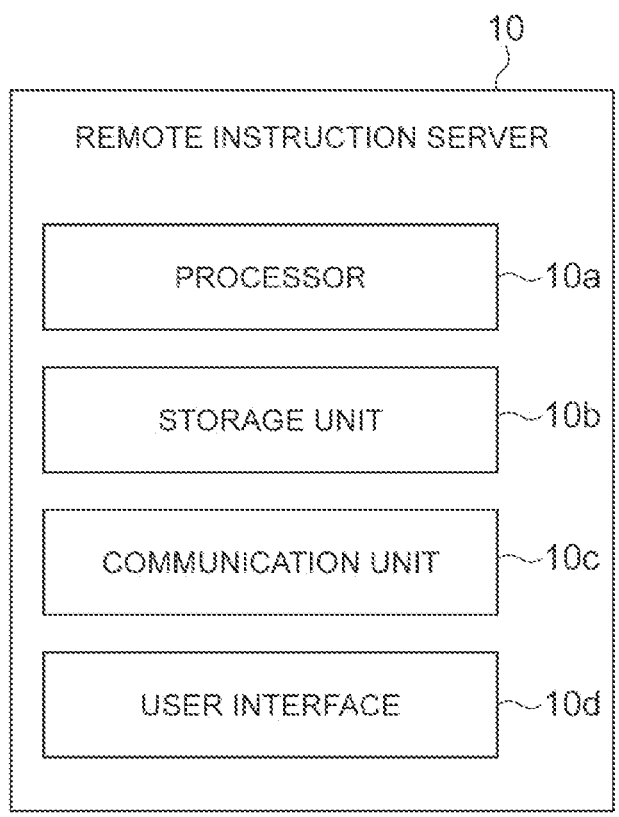
FIG. 3 is a block diagram illustrating an example of a hardware configuration of a remote instruction server of the vehicle remote instruction system according to the first embodiment.

First, a hardware configuration of the remote instruction server 10 will be described. FIG. 3 is a block diagram illustrating an example of the hardware configuration of the remote instruction server 10. As illustrated in FIG. 3, the remote instruction server 10 is configured as a general computer including a processor 10a, a storage unit 10b, a communication unit 10c, and a user interface 10d.

The processor 10a controls the remote instruction server 10 by operating various operating systems. The processor 10a is an arithmetic unit such as a central processing unit (CPU) including a control device, an arithmetic device, a register, and the like. The processor 10a performs overall management of the storage unit 10b, the communication unit 10c, and the user interface 10d. The storage unit 10b is configured to include at least one of a memory and a storage. The memory is a recording medium such as read only memory (ROM) or random access memory (RAM). The storage is a recording medium such as a hard disk drive (HDD).

The communication unit 10c is a communication device for performing communication via the network N. A network device, a network controller, a network card, and the like can be used as the communication unit 10c. The user interface 10d is an input output unit of the remote instruction server 10 to and from the user such as an administrator. The user interface 10d includes output devices such as a display and a speaker, and an input device such as a touch panel. The remote instruction server 10 does not necessarily need to be provided in the facility, and may be mounted on a moving body such as a vehicle.

Figure 4:
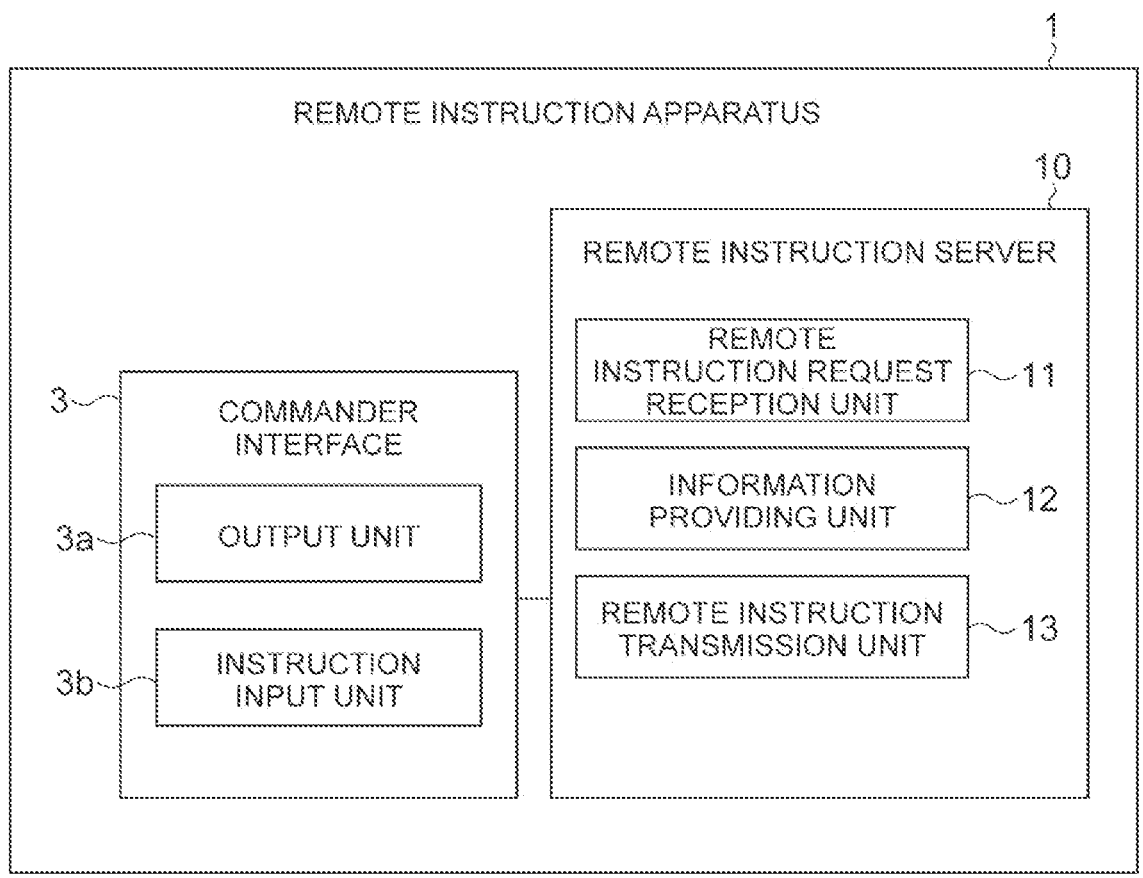
FIG. 4 is a block diagram illustrating an example of a configuration of a remote instruction apparatus according to the first embodiment.

FIG. 4 is a block diagram illustrating an example of the configuration of the remote instruction apparatus 1. As illustrated in FIG. 4, the commander interface 3 is an input output unit of the remote instruction apparatus 1 to and from the remote commander R. The commander interface 3 includes an output unit 3a and an instruction input unit 3b.

The output unit 3a is a device that outputs information used for the remote instruction of the autonomous driving vehicle 2 to the remote commander R. The output unit 3a includes a display that outputs image information and a speaker that outputs sound information.

For example, an image (an image of a scenery ahead) in front of the autonomous driving vehicle 2 captured by the camera of the autonomous driving vehicle 2 is displayed on the display. The display may have a plurality of display screens, and images of the side and/or rear of the autonomous driving vehicle 2 may be displayed. The display is not particularly limited as long as the display can provide visual information to the remote commander R. The display may be a wearable device mounted to cover the eyes of the remote commander R.

The speaker is a headset speaker mounted to a head of the remote commander R, for example. For example, the speaker informs the remote commander R of the situation of the autonomous driving vehicle 2 (for example, the situation such as a right turn at the intersection) by the voice. The speaker does not necessarily need to be a headset, and may be a stationary type.

The instruction input unit 3b is a device to which the remote instruction is input by the remote commander R. The instruction input unit 3b includes, for example, an operation lever. In the instruction input unit 3b, for example, a remote instruction to cause the autonomous driving vehicle 2 to perform progressive traveling is input by pushing down the operation lever to the inner side in the front-rear direction of the remote commander R, and a remote instruction to decelerate or to stop the autonomous driving vehicle 2 is input by pulling down the operating lever to a front side in the front-rear direction of the remote commander R.

The instruction input unit 3b may include a button, and the remote instruction may be input by the remote commander R pulling or pushing down the operation lever while pressing the button. The instruction input unit 3b may include a touch panel. The touch panel may be shared with the display of the output unit 3a. The instruction input unit 3b may include an operation pedal.

The instruction input unit 3b may have a voice recognition function or a gesture recognition function. The gesture of the remote commander R can be recognized by the camera and/or the radar sensor mounted on the commander interface 3. In the instruction input unit 3b, the remote instruction may be input by combining equal to or more than two of the operation lever operation, the button operation, the touch panel operation, the operation pedal operation, the voice input, and the gesture.

Next, a functional configuration of the remote instruction server 10 will be described. As illustrated in FIG. 4, the remote instruction server 10 includes a remote instruction request reception unit (sensor information reception unit) 11, an information providing unit 12, a remote instruction transmission unit 13.

The remote instruction request reception unit 11 receives a remote instruction request transmitted from the autonomous driving vehicle 2 to the remote instruction apparatus 1. In addition, the remote instruction request reception unit 11 receives detection information (sensor information) of the external sensor 22 from the remote instruction request unit 34 of the autonomous driving vehicle 2 which transmits the remote instruction request, together with the remote instruction request.

If the remote instruction request is received by the remote instruction request reception unit 11, the information providing unit 12 requests the responsible remote commander R to input the remote instruction via the commander interface 3.

In addition, the information providing unit 12 provides information on the autonomous driving vehicle 2 to the remote commander R based on the detection information by the external sensor 22 on the autonomous driving vehicle 2 acquired by the remote instruction request reception unit 11. For example, the information providing unit 12 displays an image in front of the autonomous driving vehicle 2 on the display of the output unit 3a of the commander interface 3. The information providing unit 12 may display an image viewed from the vicinity of the driver's seat of the autonomous driving vehicle 2 by viewpoint conversion. The information providing unit 12 may display the side image and rear image of the autonomous driving vehicle 2. The information providing unit 12 may display a panoramic image that is a composite image of the images in which the surroundings of the autonomous driving vehicle 2 are captured, or may display an overhead image generated to look down the autonomous driving vehicle 2 by the image composition and the viewpoint conversion. The information providing unit 12 may perform highlight display of an object in the image (for example, marking that surrounds another vehicle or the like with a frame). If a traffic signal is included in the image, the information providing unit 12 may display a result of recognizing the lighting state of the traffic signal on the display.

The information providing unit 12 may display various information on the display, not limited to the image captured by the camera of the autonomous driving vehicle 2. The information providing unit 12 may display the situation of the autonomous driving vehicle 2 which requested for the remote instruction (the situation at the time of the right turn at the intersection) using texts or icons. The information providing unit 12 may display a type of remote instruction that can be selected by the remote commander R, on the display. The information providing unit 12 may display the information (a locus of the autonomous driving vehicle 2 performing the progressive traveling corresponding to the remote instruction to perform the progressive traveling) relating to the trajectory of the autonomous driving vehicle 2 in accordance with the remote instruction, on the display.

The information providing unit 12 may display the information on an object detected by the radar sensor of the autonomous driving vehicle 2. The information on the object may be displayed as an icon in the overhead image. When the types of the objects are identified, the icons may be displayed according to the types of the objects. The information providing unit 12 may display the map information on the surroundings of the autonomous driving vehicle 2 acquired based on the position information of the autonomous driving vehicle 2, on the display. The map information may be included in the remote instruction server 10 or may be acquired from another server or the like. The map information on the surroundings of the autonomous driving vehicle 2 may be acquired from the autonomous driving vehicle 2.

The information providing unit 12 may display information on the vehicle speed of the autonomous driving vehicle 2 on the display, and may display information on the steering angle of the autonomous driving vehicle 2 on the display. The information providing unit 12 may display information on a slope of the road where the autonomous driving vehicle 2 is positioned, on the display. If the autonomous driving vehicle 2 has a vehicle interior camera, the information providing unit 12 may display an image of the vehicle interior of the autonomous driving vehicle 2 as necessary.

The information providing unit 12 may provide the sound information to the remote commander R through the speaker of the output unit 3a of the commander interface 3. In this case, the information providing unit 12 may output the approach of another vehicle or the like around the autonomous driving vehicle 2, from the speaker as the sound or the voice. It is not essential to provide the information through the speaker.

If the remote commander R inputs the remote instruction to the instruction input unit 3b of the commander interface 3, the remote instruction transmission unit 13 transmits the input remote instruction to the autonomous driving vehicle 2. In addition, the remote instruction transmission unit 13 transmits the instruction transmission time, which is a time at which the remote instruction was transmitted (the time at which the remote instruction was transmitted), to the autonomous driving vehicle 2 together with the remote instruction.

If the remote instruction input by the remote commander R is transmitted to the autonomous driving vehicle 2, the information providing unit 12 may continuously transmit the information on the autonomous driving vehicle 2 to the remote commander R, or may switch the information to information on another autonomous driving vehicle 2 that requests for the remote instruction.

Flow of Processing by Vehicle Remote Instruction System

Figure 5:
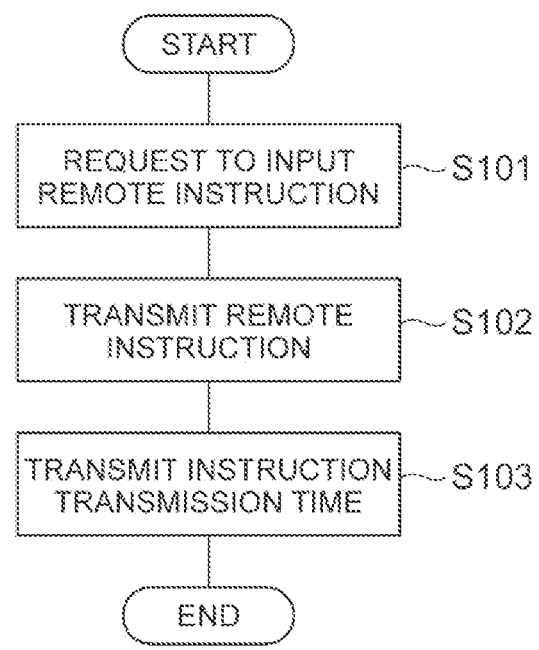
FIG. 5 is a flowchart illustrating an example of remote instruction transmission processing performed by the remote instruction apparatus.

A flow of processing for transmitting the remote instruction to the autonomous driving vehicle 2 based on the remote instruction request in the remote instruction apparatus 1 will be described. FIG. 5 is a flowchart illustrating an example of remote instruction transmission processing performed by the remote instruction apparatus 1. The processing illustrated in FIG. 5 is started when the remote instruction request reception unit 11 receives a remote instruction request.

As illustrated in FIG. 5, when the remote instruction request reception unit 11 receives the remote instruction request from the autonomous driving vehicle 2, the information providing unit 12 requests the remote commander R to input a remote instruction (S101). When the remote commander R inputs the remote instruction to the instruction input unit 3b of the commander interface 3, the remote instruction transmission unit 13 transmits the input remote instruction to the autonomous driving vehicle 2 (S102). In addition, when transmitting the remote instruction, the remote instruction transmission unit 13 transmits the instruction transmission time to the autonomous driving vehicle 2 together with the remote instruction (S103).

Figure 6:
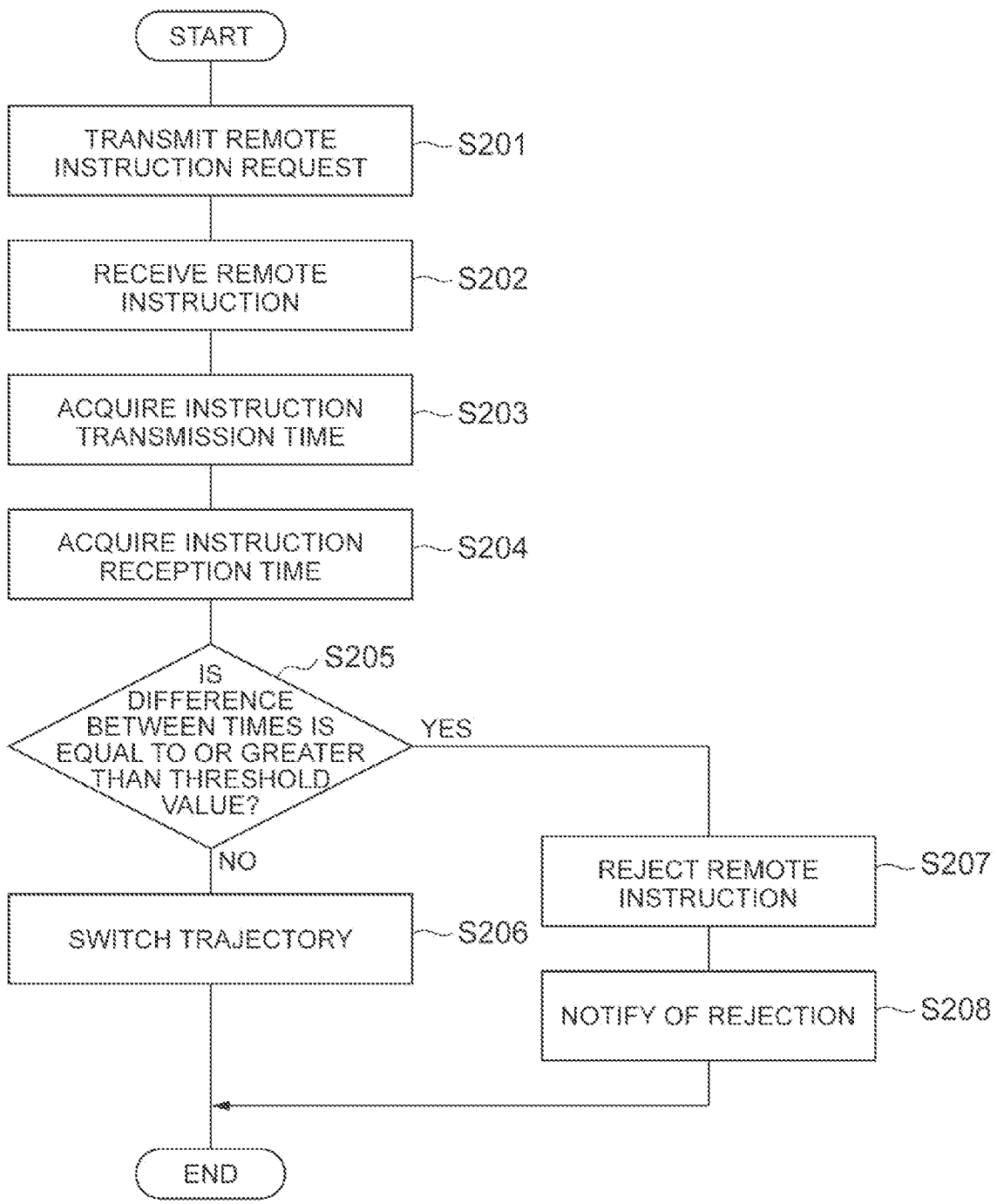
FIG. 6 is a flowchart illustrating an example of remote instruction rejection determination processing performed by the autonomous driving vehicle.

Next, a flow of processing by the autonomous driving vehicle 2 for performing the control in accordance with the received remote instruction or rejecting the remote instruction after performing the remote instruction request, will be described. FIG. 6 is a flowchart illustrating an example of the remote instruction rejection determination processing performed in the autonomous driving vehicle 2. The processing illustrated in FIG. 6 is started when the autonomous driving vehicle 2 reaches the remote instruction requested location and the remote instruction request unit 34 determines that the remote instruction request is required.

As illustrated in FIG. 6, if it is determined that the remote instruction request is required, the remote instruction request unit 34 transmits the remote instruction request to the remote instruction apparatus 1 (S201). The remote instruction reception unit 36 receives the remote instruction transmitted from the remote instruction apparatus 1 (S202). The transmission time acquisition unit 37 acquires the instruction transmission time transmitted by the remote instruction apparatus 1 together with the remote instruction (S203). The reception time acquisition unit 38 acquires an instruction reception time at which the remote instruction reception unit 36 receives the remote instruction (S204).

The delay determination unit 39 determines whether a communication delay is present or not based on whether or not a difference between the instruction transmission time and the instruction reception time is equal to or greater than a first threshold value (S205). If the difference between the instruction transmission time and the instruction reception time is not greater than or equal to the first threshold value (NO in S205), the autonomous driving control unit 41 switches the trajectory used for the travel control from the first trajectory to the second trajectory, and starts performing the autonomous driving of the autonomous driving vehicle 2 based on the second trajectory (S206).

If the difference between the instruction transmission time and the instruction reception time is equal to or greater than the first threshold (YES in S205), the rejection unit 40 rejects the remote instruction transmitted from the remote instruction apparatus 1 in response to the remote instruction request (S207). In this way, the autonomous driving control unit 41 maintains the first trajectory without switching the trajectory used for the travel control from the first trajectory to the second trajectory. Then, when rejecting the remote instruction, the rejection unit 40 notifies the remote instruction apparatus 1 of the fact that the remote instruction is rejected via the communication unit 25 (S208).

As described above, if the communication delay occurs, the autonomous driving vehicle 2 rejects the remote instruction transmitted from the remote instruction apparatus 1 in response to the remote instruction request. Here, for example, if the communication delay occurs between the remote instruction apparatus 1 and the autonomous driving vehicle 2, when the autonomous driving vehicle 2 receives the remote instruction, the surrounding situation has already changed, and the received remote instructions may become not appropriate. Therefore, in the vehicle remote instruction system 100, if it is determined that the communication delay occurs, the remote instruction transmitted in response to the remote instruction request is rejected. Accordingly, it is possible to suppress the travel of the autonomous driving vehicle 2 from being controlled based on the inappropriate remote instruction. Therefore, even if the communication delay occurs between the remote instruction apparatus 1 and the autonomous driving vehicle 2, the vehicle remote instruction system 100 can appropriately control the travel of the autonomous driving vehicle 2 by rejecting the remote instruction.

If the difference between the instruction transmission time at which the remote instruction is transmitted and the instruction reception time at which the remote instruction is received is equal to or greater than the first threshold value, the delay determination unit 39 determines that the communication delay occurs. In this case, the vehicle remote instruction system 100 can more appropriately determine whether or not the communication delay occurs, using the instruction transmission time and the instruction reception time.

Second Embodiment

Figure 7:
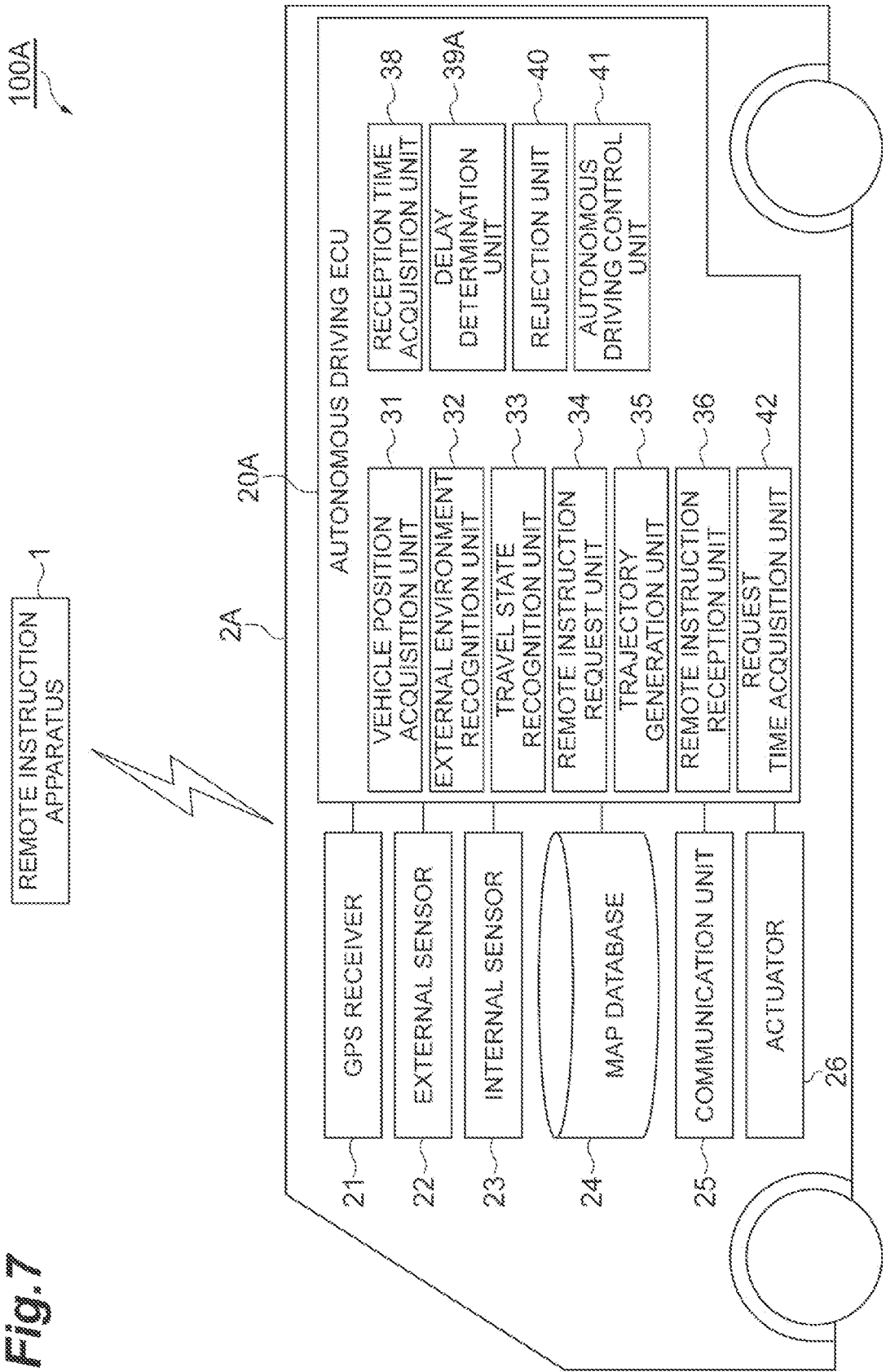
FIG. 7 is a block diagram illustrating an example of a configuration of an autonomous driving vehicle in automatic vehicle remote instruction system according to a second embodiment.

A second embodiment of the vehicle remote instruction system will be described. The description below will be focused on differences from the vehicle remote instruction system 100 according to the first embodiment, and the same reference numerals will be given to the same or similar elements, and detailed description thereof will not be repeated. As illustrated in FIG. 7, a vehicle remote instruction system 100A according to the present embodiment is a system that performs a remote instruction from the remote instruction apparatus 1 to the autonomous driving vehicle 2A based on an operation by the remote commander R.

Configuration of Autonomous Driving Vehicle

The autonomous driving vehicle 2A includes an autonomous driving ECU 20A as an example. Functionally, the autonomous driving ECU 20A includes a request time acquisition unit 42 and a delay determination unit 39A instead of the transmission time acquisition unit 37 and the delay determination unit 39 of the autonomous driving ECU 20 of the autonomous driving vehicle 2 according to the first embodiment. Hereinafter, the request time acquisition unit 42 and the delay determination unit 39A will be mainly described.

The request time acquisition unit 42 acquires a request transmission time, which is a time at which the autonomous driving vehicle 2 transmits a remote instruction request to the remote instruction apparatus 1. Here, the request time acquisition unit 42 acquires and stores the time when the remote instruction request unit 34 transmits the remote instruction request, as the request transmission time.

The delay determination unit 39A determines whether a communication delay occurs between the remote instruction apparatus 1 and the autonomous driving vehicle 2A. Specifically, the delay determination unit 39A determines whether the communication delay is present or not based on the difference between the request transmission time acquired by the request time acquisition unit 42 and the instruction reception time acquired by the reception time acquisition unit 38. Here, if the difference between the request transmission time at which the remote instruction request unit 34 transmits the remote instruction request and the instruction reception time at which the remote instruction is received by the remote instruction reception unit 36 is equal to or greater than a second threshold value set in advance, the delay determination unit 39A determines that a communication delay occurs. If the difference between the request transmission time and the instruction reception time is less than the second threshold value, the delay determination unit 39A determines that the communication delay does not occur.

The second threshold value may be determined based on, for example, whether it is permissible to control the travel of the autonomous driving vehicle 2 based on the remote instruction even if the remote instruction becomes temporarily old due to the communication delay.

In the determination of the communication delay in the present embodiment, unlike the first embodiment, the instruction transmission time, which is the time at which the remote instruction is transmitted, is not used. Therefore, the remote instruction transmission unit 13 of the remote instruction server 10 does not need to transmit the instruction transmission time to the autonomous driving vehicle 2 together with the remote instruction.

Flow of Processing by Vehicle Remote Instruction System

Figure 8:
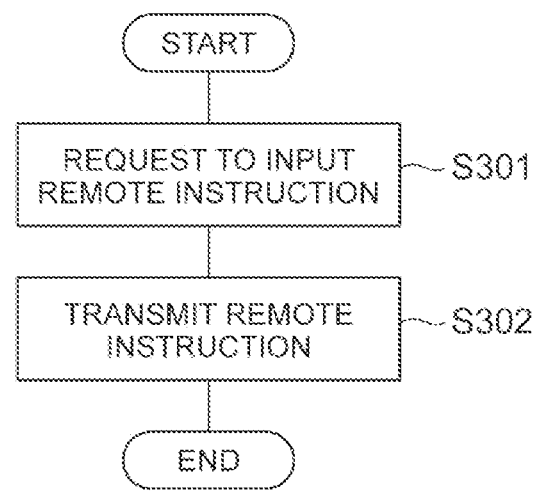
FIG. 8 is a flowchart illustrating an example of remote instruction transmission processing performed by the remote instruction apparatus.

A flow of processing for transmitting the remote instruction to the autonomous driving vehicle 2 based on the remote instruction request in the remote instruction apparatus 1 will be described. FIG. 8 is a flowchart illustrating an example of remote instruction transmission processing performed by the remote instruction apparatus 1. The processing illustrated in FIG. 8 is started when the remote instruction request reception unit 11 receives a remote instruction request.

As illustrated in FIG. 8, when the remote instruction request reception unit 11 receives the remote instruction request from the autonomous driving vehicle 2A, the information providing unit 12 requests the remote commander R to input the remote instruction (S301). If the remote commander R inputs the remote instruction to the instruction input unit 3b of the commander interface 3, the remote instruction transmission unit 13 transmits the input remote instruction to the autonomous driving vehicle 2A (S302).

Figure 9:
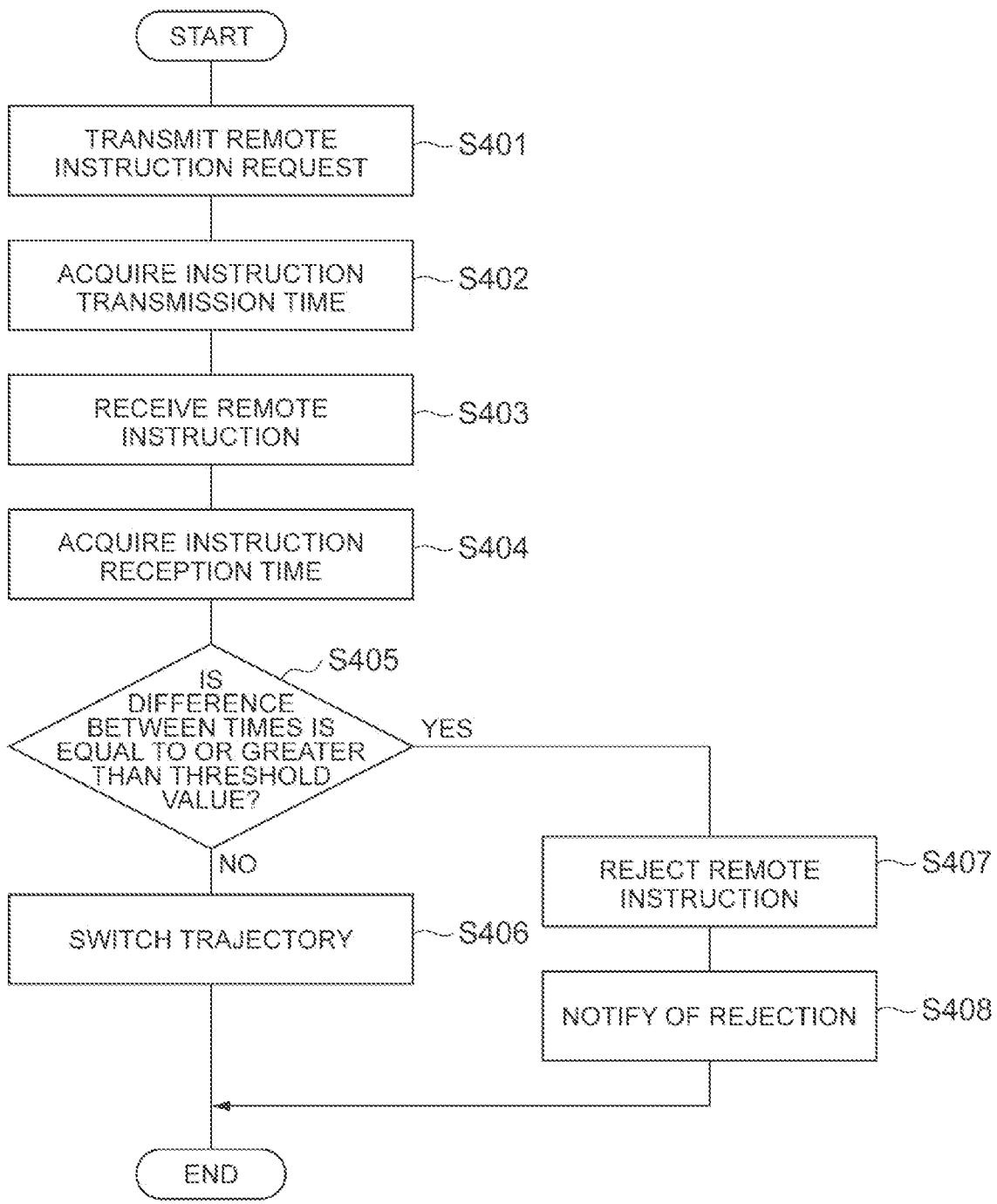
FIG. 9 is a flowchart illustrating an example of a remote instruction rejection determination processing performed by the autonomous driving vehicle.

Next, a flow of processing by the autonomous driving vehicle 2A for performing the control in accordance with the received remote instruction or rejecting the remote instruction after performing the remote instruction request, will be described. FIG. 9 is a flowchart illustrating an example of the remote instruction rejection determination processing performed in the autonomous driving vehicle 2A. The processing illustrated in FIG. 9 is started when the autonomous driving vehicle 2A reaches the remote instruction requested location and the remote instruction request unit 34 determines that the remote instruction request is required.

As illustrated in FIG. 9, if it is determined that the remote instruction request is required, the remote instruction request unit 34 transmits the remote instruction request to the remote instruction apparatus 1 (S401). The request time acquisition unit 42 acquires the request transmission time, which is the time at which the remote instruction request unit 34 transmits the remote instruction request (S402). The remote instruction reception unit 36 receives the remote instruction transmitted from the remote instruction apparatus 1 (S403). The reception time acquisition unit 38 acquires the instruction reception time at which the remote instruction reception unit 36 receives the remote instruction (S404).

The delay determination unit 39A determines whether a communication delay is present or not based on whether or not the difference between the request transmission time and the instruction reception time is equal to or greater than the second threshold value (S405). The processing in S406 to S408 is the same as the processing in S206 to S208 described with reference to FIG. 6 in the first embodiment, and a detailed description will not be repeated.

As described above, if the communication delay occurs, the autonomous driving vehicle 2A rejects the remote instruction transmitted from the remote instruction apparatus 1 in response to the remote instruction request. If the difference between the request transmission time at which the remote instruction request is transmitted and the instruction reception time at which the remote instruction is received is equal to or greater than the second threshold value, the delay determination unit 39A determines that the communication delay occurs. In this case, the vehicle remote instruction system 100A can more appropriately determine whether or not the communication delay occurs, using the request transmission time and the instruction reception time.

Third Embodiment

A third embodiment of a vehicle remote instruction system will be described. Differently from the vehicle remote instruction systems 100 and 100A according to the first and second embodiments, the vehicle remote instruction system according to the present embodiment determines whether a communication delay is present or not using detection information from the external sensor instead of the time. The description below will be focused on differences from the vehicle remote instruction system 100 according to the first embodiment, and the same reference numerals will be given to the same or similar elements, and detailed description thereof will not be repeated.

Figure 10:
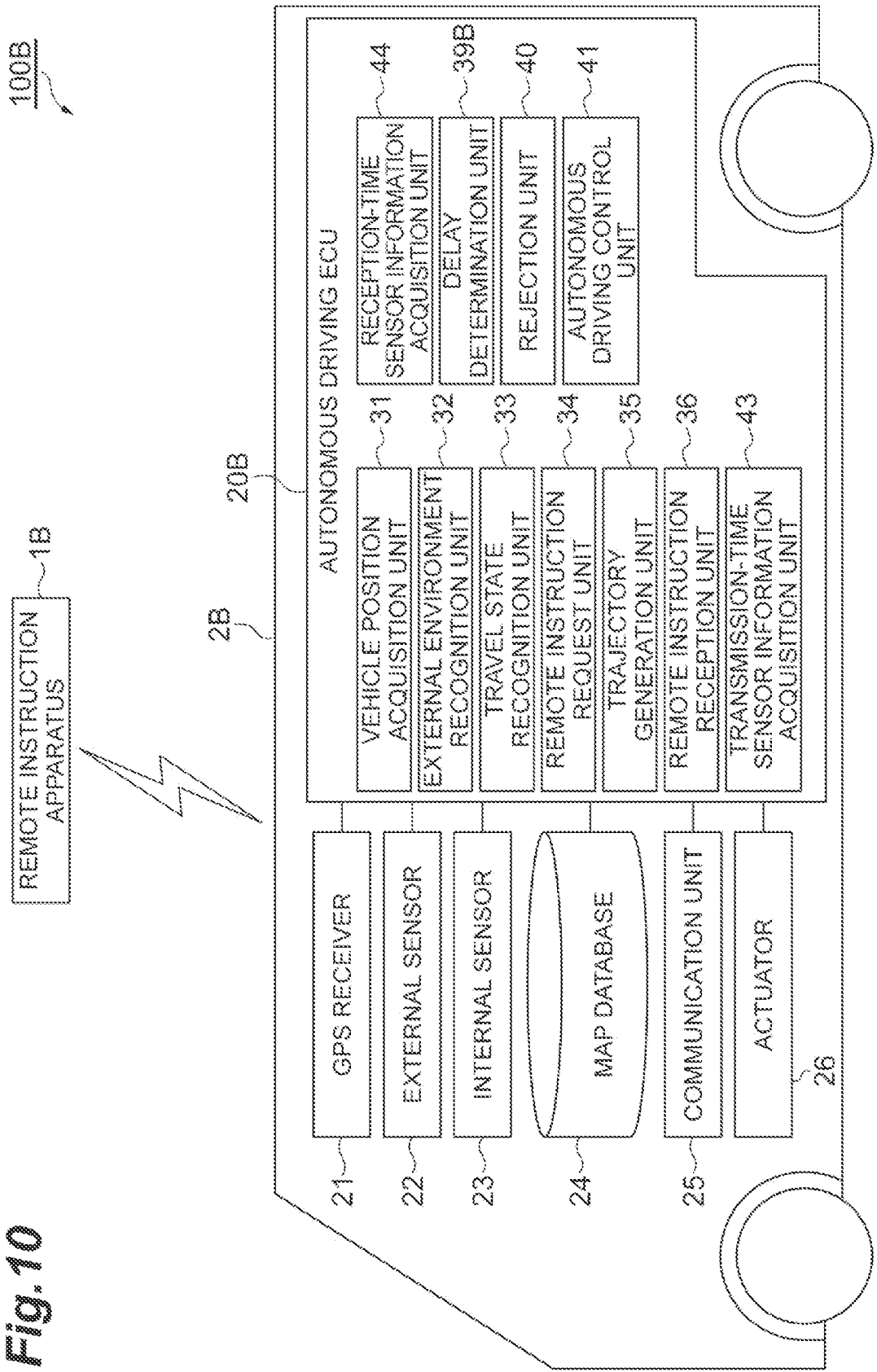
FIG. 10 is a block diagram illustrating an example of a configuration of an autonomous driving vehicle in a vehicle remote instruction system according to a third embodiment.

As illustrated in FIG. 10, a vehicle remote instruction system 100B according to the present embodiment is a system that performs a remote instruction from a remote instruction apparatus 1B to an autonomous driving vehicle 2B based on an operation by the remote commander R.

Configuration of Autonomous Driving Vehicle

The autonomous driving vehicle 2B includes an autonomous driving ECU 20B as an example. Functionally, the autonomous driving ECU 20B includes a transmission-time sensor information acquisition unit 43, a reception-time sensor information acquisition unit 44, and a delay determination unit 39B instead of the transmission time acquisition unit 37, the reception time acquisition unit 38, and the delay determination unit 39 of the autonomous driving ECU 20 of the autonomous driving vehicle 2 according to the first embodiment. Hereinafter, the transmission-time sensor information acquisition unit 43, the reception-time sensor information acquisition unit 44, and the delay determination unit 39B will be mainly described.

The transmission-time sensor information acquisition unit 43 acquires the detection information received by the remote instruction request reception unit 11 of the remote instruction apparatus 1B at the time when the remote instruction apparatus 1B transmits the remote instruction, as instruction transmission-time sensor information. Specifically, the transmission-time sensor information acquisition unit 43 acquires the instruction transmission-time sensor information transmitted by the remote instruction apparatus 1B together with the remote instruction. The configuration for the remote instruction apparatus 1B to transmit the instruction transmission-time sensor information will be described later in detail.

The reception-time sensor information acquisition unit 44 acquires the detection information by the external sensor 22 at the time when the autonomous driving vehicle 2B receives the remote instruction, as the instruction reception-time sensor information. Specifically, the reception-time sensor information acquisition unit 44 acquires the detection information by the external sensor 22 at the time when the remote instruction reception unit 36 receives the remote instruction from the remote instruction apparatus 1B, as the instruction reception-time sensor information.

The delay determination unit 39B determines whether or not a communication delay occurs based on the instruction transmission-time sensor information acquired by the transmission-time sensor information acquisition unit 43 and the instruction reception-time sensor information acquired by the reception-time sensor information acquisition unit 44. As the instruction transmission-time sensor information and the instruction reception-time sensor information used for the determination, for example, a camera image, a group of points from the LIDAR, the target object detected by the radar sensor, and the like can be included.

Here, the delay determination unit 39B compares the instruction transmission-time sensor information with the instruction reception-time sensor information, and determines whether or not the communication delay occurs based on a difference between the two. If the difference between the instruction transmission-time sensor information and the instruction reception-time sensor information is equal to or greater than a first difference threshold value, the delay determination unit 39B can determine that the communication delay occurs, for example. For example, if the difference between the instruction transmission-time sensor information and the instruction reception-time sensor information is less than the first difference threshold value, the delay determination unit 39B can determine that the communication delay does not occur.

For example, even if a deviation occurs between the external environment of the autonomous driving vehicle 2B used when inputting the remote instruction and the external environment at the time of receiving the remote instruction, the first difference threshold value may be set based on whether it is permissible to control the travelling of the autonomous driving vehicle 2B based on the received remote instruction or not.

Figure 11A:
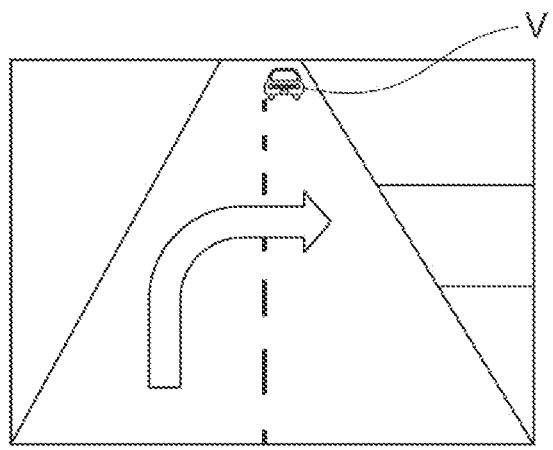
FIG. 11A is a diagram illustrating instruction transmission-time sensor information received by a remote instruction request reception unit at a time when the remote instruction apparatus transmits the remote instruction.
Figure 11B:
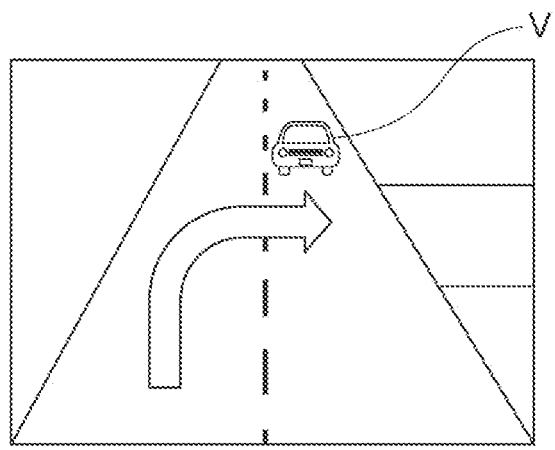
FIG. 11B is a diagram illustrating instruction reception-time sensor information detected by an external sensor at a time when the autonomous driving vehicle receives the remote instruction.

FIG. 11A and FIG. 11B are diagrams illustrating detection information (here, a camera image in front of the autonomous driving vehicle 2B) of the external sensor 22 in a state where the autonomous driving vehicle 2 is trying to make a right turn. FIG. 11A is a diagram illustrating the detection information (instruction transmission-time sensor information) received by the remote instruction request reception unit 11 of the remote instruction apparatus 1B when the remote instruction apparatus 1B transmits the remote instruction. FIG. 11B is a diagram illustrating the detection information (instruction reception-time sensor information) detected by the external sensor 22 when the autonomous driving vehicle 2B receives the remote instruction. A vehicle V in FIG. 11A and FIG. 11B is an oncoming vehicle that travels in front of the autonomous driving vehicle 2B. When the communication delay between the remote instruction apparatus 1B and the autonomous driving vehicle 2B increases, the difference between the two detection information increases. For example, in the examples illustrated in FIG. 11A and FIG. 11B, as the communication delay increases, the difference of a position of the vehicle V increases.

Hereinafter, an example of a method of comparing the instruction transmission-time sensor information and the instruction reception-time sensor information performed by the delay determination unit 39B will be described.

Comparison of Sensor Low Level

The delay determination unit 39B can directly compare the detection values (sensor values) of the instruction transmission-time sensor information and the instruction reception-time sensor information. For example, if the instruction transmission-time sensor information and the instruction reception-time sensor information are camera images, the delay determination unit 39 performs matching of the camera images illustrated in FIG. 11A and FIG. 11B using a phase only correlation (POC). The delay determination unit 39B can calculate a correlation between the camera images using the correlation value at the time of performing the matching. The delay determination unit 39B can use the correlation between the camera images as the difference between the instruction transmission-time sensor information and the instruction reception-time sensor information. Similarly, even if the instruction transmission-time sensor information and the instruction reception-time sensor information are group of points by the LIDAR, the delay determination unit 39B can directly compare the detection values (sensor values).

Comparison of Recognition Results

The delay determination unit 39B can recognize each of the external environment of the autonomous driving vehicle 2B at the time of transmitting the remote instruction and the external environment of the autonomous driving vehicle 2B at the time of receiving the remote instruction based on the instruction transmission-time sensor information and the instruction reception-time sensor information, and can determine the difference based on the recognition result of the external environments. In this case, for example, when recognizing each of the external environments at the time of transmitting and receiving the remote instruction, the delay determination unit 39B may extract only a specific moving obstacle, and may compare the position information of the extracted moving obstacle. For example, the moving obstacle to be extracted may be all the dynamic obstacles intersecting the trajectory of the autonomous driving vehicle 2B.

Configuration of Remote Instruction Apparatus

Figure 12:
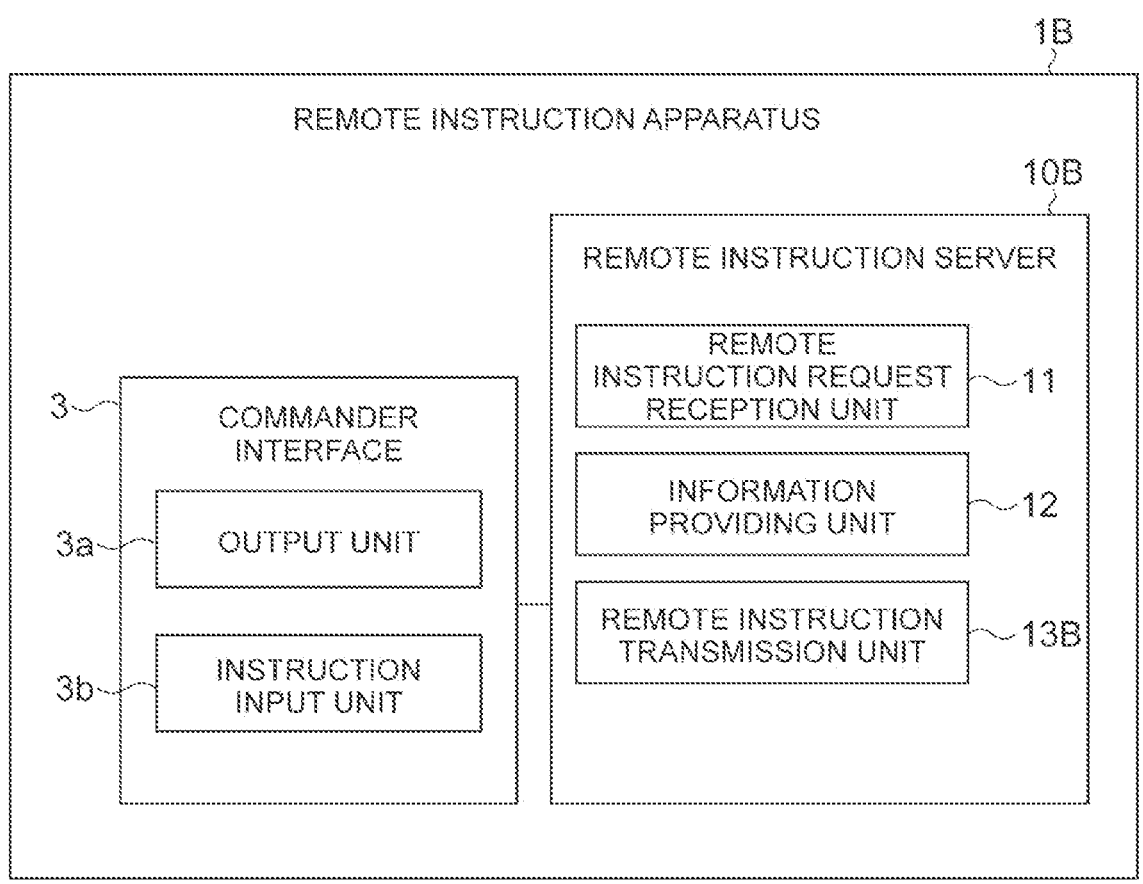
FIG. 12 is a block diagram illustrating an example of a configuration of a remote instruction apparatus according to the third embodiment.

As illustrated in FIG. 12, the remote instruction apparatus 1B includes a remote instruction server 10B. Functionally, the remote instruction server 10B includes a remote instruction request reception unit 11, an information providing unit 12, and a remote instruction transmission unit 13B.

If the remote commander R inputs the remote instruction to the instruction input unit 3b of the commander interface 3, the remote instruction transmission unit 13B transmits the remote instruction to the autonomous driving vehicle 2B. In addition, the remote instruction transmission unit 13B transmits the detection information (detection information being received) received by the remote instruction request reception unit 11 at the time when the remote instruction transmission unit 13B transmits the remote instruction together with the remote instruction to the autonomous driving vehicle 2B, as the instruction transmission-time sensor information.

Flow of Processing by Vehicle Remote Instruction System

Figure 13:
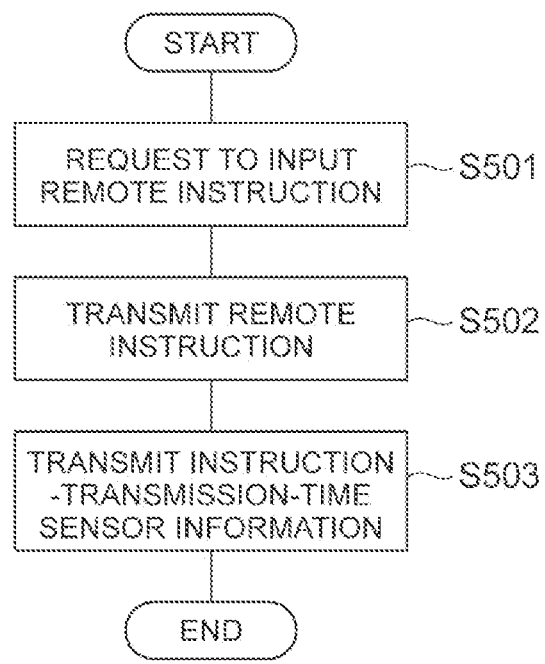
FIG. 13 is a flowchart illustrating an example of remote instruction transmission processing performed by the remote instruction apparatus.

A flow of processing for transmitting the remote instruction to the autonomous driving vehicle 2B based on the remote instruction request in the remote instruction apparatus 1B will be described. FIG. 13 is a flowchart illustrating an example of remote instruction transmission processing performed by the remote instruction apparatus 1B. The processing illustrated in FIG. 13 is started when the remote instruction request reception unit 11 receives a remote instruction request.

As illustrated in FIG. 13, if the remote instruction request reception unit 11 receives the remote instruction request from the autonomous driving vehicle 2B, the information providing unit 12 requests the remote commander R to input a remote instruction (S501). If the remote commander R inputs the remote instruction to the instruction input unit 3b of the commander interface 3, the remote instruction transmission unit 13B transmits the input remote instruction to the autonomous driving vehicle 2B (S502). In addition, when transmitting the remote instruction, the remote instruction transmission unit 13B transmits the instruction transmission-time sensor information to the autonomous driving vehicle 2B together with the remote instruction (S503).

Figure 14:
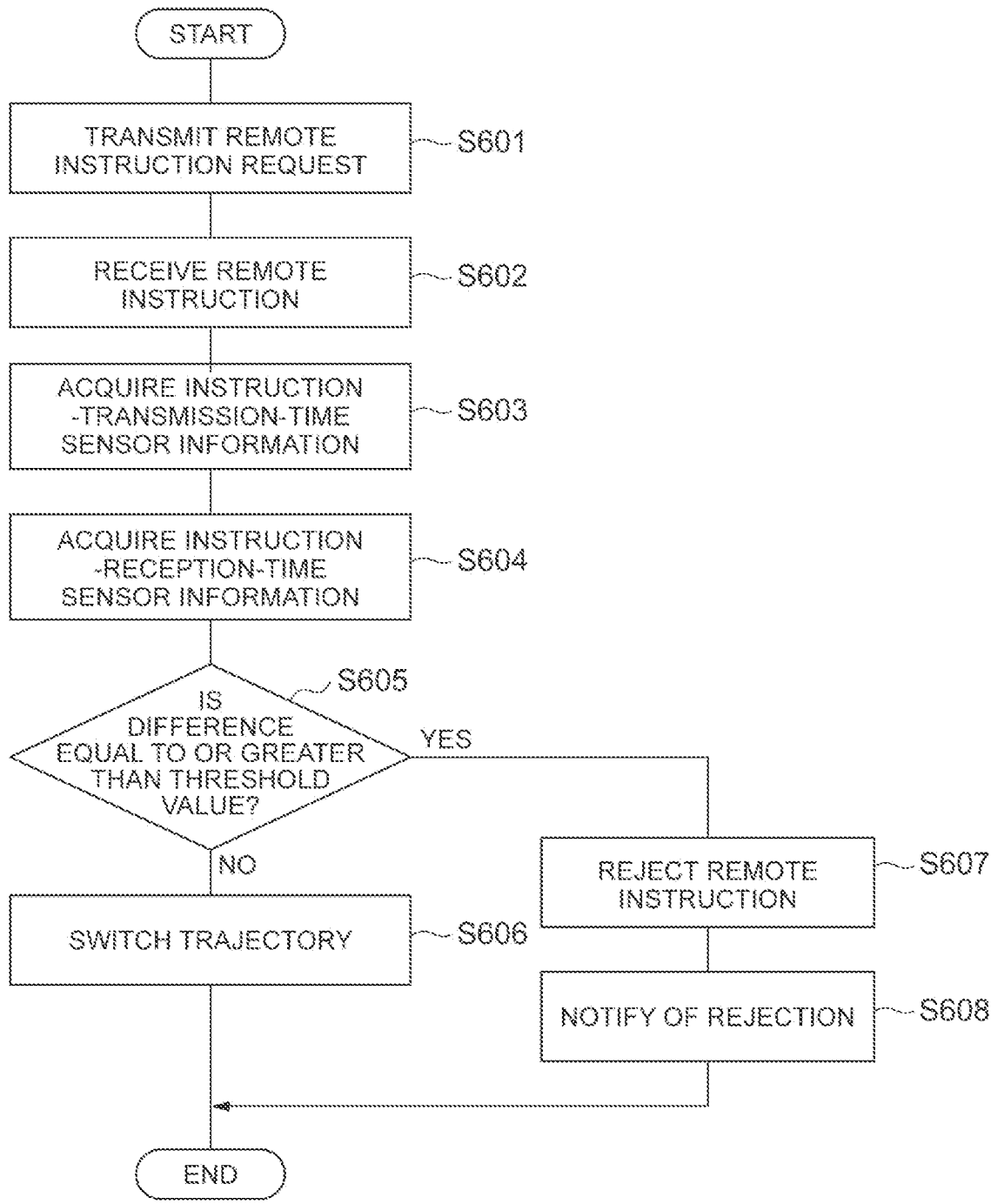
FIG. 14 is a flowchart illustrating an example of remote instruction rejection determination processing performed by the autonomous driving vehicle.

Next, a flow of processing for performing a control in accordance with the received remote instruction or rejecting the remote instruction in the autonomous driving vehicle 2B after making a remote instruction request, will be described. FIG. 14 is a flowchart illustrating an example of remote instruction rejection determination processing performed by the autonomous driving vehicle 2B. The processing illustrated in FIG. 14 is started when the autonomous driving vehicle 2B reaches the remote instruction requested location and the remote instruction request unit 34 determines that the remote instruction request is required.

As illustrated in FIG. 14, if it is determined that the remote instruction request is required, the remote instruction request unit 34 transmits a remote instruction request to the remote instruction apparatus 1B (S601). The remote instruction reception unit 36 receives the remote instruction transmitted from the remote instruction apparatus 1B (S602). The transmission-time sensor information acquisition unit 43 acquires the instruction transmission-time sensor information transmitted by the remote instruction apparatus 1B together with the remote instruction (S603). The reception-time sensor information acquisition unit 44 acquires the detection information by the external sensor 22 at the time when the remote instruction reception unit 36 receives the remote instruction from the remote instruction apparatus 1B, as the as the instruction reception-time sensor information (S604).

The delay determination unit 39B determines whether the communication delay is present or not based on whether or not the difference between the instruction transmission-time sensor information and the instruction reception-time sensor information is equal to or greater than the first difference threshold value (S605). The processing in S606 to S608 are the same as the processing in S206 to S208 described with reference to FIG. 6 in the first embodiment, and the detailed description thereof will not be repeated.

As described above, if the communication delay occurs, the autonomous driving vehicle 2B rejects the remote instruction transmitted from the remote instruction apparatus 1B in response to the remote instruction request. The delay determination unit 39B determines whether or not a communication delay occurs based on the instruction transmission-time sensor information acquired by the transmission-time sensor information acquisition unit 43 and the instruction reception-time sensor information acquired by the reception-time sensor information acquisition unit 44. In this case, the vehicle remote instruction system 100B can more appropriately determine whether the communication delay occurs or not based on the instruction transmission-time sensor information and the instruction reception-time sensor information.

Fourth Embodiment

A fourth embodiment of the vehicle remote instruction system will be described. Similarly to the vehicle remote instruction system 100B according to the third embodiment, the vehicle remote instruction system according to the present embodiment determines whether a communication delay occurs or not using the detection information by an external sensor. The description below will be focused on differences from the vehicle remote instruction systems 100B according to the third embodiment, and the same reference numerals will be given to the same or similar elements, and detailed description thereof will not be repeated.

Figure 15:
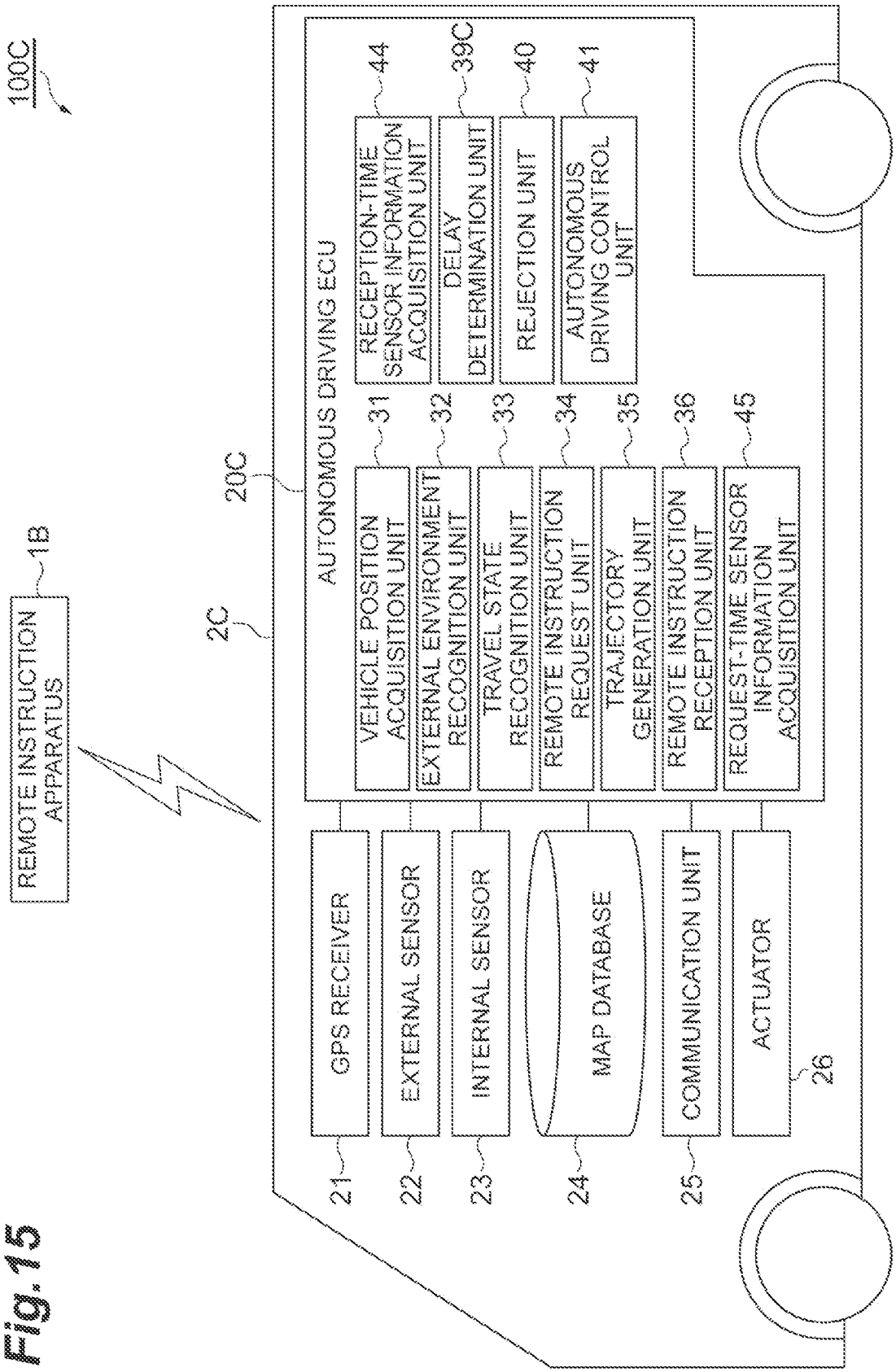
FIG. 15 is a block diagram illustrating an example of a configuration of an autonomous driving vehicle in the vehicle remote instruction system according to a fourth embodiment.

As illustrated in FIG. 15, a vehicle remote instruction system 100C according to the present embodiment is a system that performs the remote instruction from the remote instruction apparatus 1B to the autonomous driving vehicle 2C based on the operation by the remote commander R.

Configuration of Autonomous Driving Vehicle

The autonomous driving vehicle 2C includes an autonomous driving ECU 20C as an example. Functionally, the autonomous driving ECU 20C includes a request-time sensor information acquisition unit 45 and a delay determination unit 39C instead of the transmission-time sensor information acquisition unit 43 and the delay determination unit 39B of the autonomous driving ECU 20B of the autonomous driving vehicle 2B according to the third embodiment. Hereinafter, the description will be focused on the request-time sensor information acquisition unit 45 and the delay determination unit 39C.

The request-time sensor information acquisition unit 45 acquires detection information by the external sensor 22 at the time when the autonomous driving vehicle 2B transmits the remote instruction request, as instruction request-time sensor information. Here, the request-time sensor information acquisition unit 45 acquires and stores the detection information by the external sensor 22 when the remote instruction request unit 34 transmits the remote instruction request, as the instruction request-time sensor information.

The delay determination unit 39C determines whether a communication delay occurs or not based on the instruction request-time sensor information acquired by the request-time sensor information acquisition unit 45 and the instruction reception-time sensor information acquired by the reception-time sensor information acquisition unit 44. As the instruction request-time sensor information and the instruction reception-time sensor information used for the determination include, for example, a camera image, a group of points by the LIDAR, a target object detected by the radar sensor, and the like.

Here, the delay determination unit 39C compares the instruction request-time sensor information with the instruction reception-time sensor information, and determines whether the communication delay occurs or not based on the difference between the two. If the difference between the instruction request-time sensor information and the instruction reception-time sensor information is equal to or greater than a second difference threshold value set in advance, the delay determination unit 39C can determine that the communication delay occurs, for example. If the difference between the instruction request-time sensor information and the instruction reception-time sensor information is less than the predetermined second separation threshold value set in advance, the delay determination unit 39C can determine that the communication delay does not occur, for example.

For example, even if the external environment of the autonomous driving vehicle 2C from the remote instruction request time to the remote instruction reception time is changed, the second difference threshold value may be set based on whether it is permissible to control the travelling of the autonomous driving vehicle 2C based on the received remote instruction or not.

As an example, as the comparison method between the instruction request-time sensor information and the instruction reception-time sensor information, the delay determination unit 39C may use the same comparison method as the delay determination unit 39B according to the above-described third embodiment.

In the determination of the communication delay in the present embodiment, unlike the third embodiment, the instruction transmission-time sensor information received by the remote instruction request reception unit 11 of the remote instruction apparatus 1B at the time when the remote instruction apparatus 1B transmits the remote instruction, is not used. Therefore, the remote instruction transmission unit 13B of the remote instruction server 10B does not need to transmit the instruction transmission-time sensor information to the autonomous driving vehicle 2C together with the remote instruction.

Flow of Processing by Vehicle Remote Instruction System

In the remote instruction apparatus 1B, the flow of processing for transmitting the remote instruction to the autonomous driving vehicle 2C based on the remote instruction request is similar to the flow of remote instruction transmission processing performed by the remote instruction apparatus 1 according to the second embodiment described with reference to FIG. 8. Therefore, a detailed description of the flow of remote instruction transmission processing performed by the remote instruction apparatus 1B will not be repeated.

Figure 16:
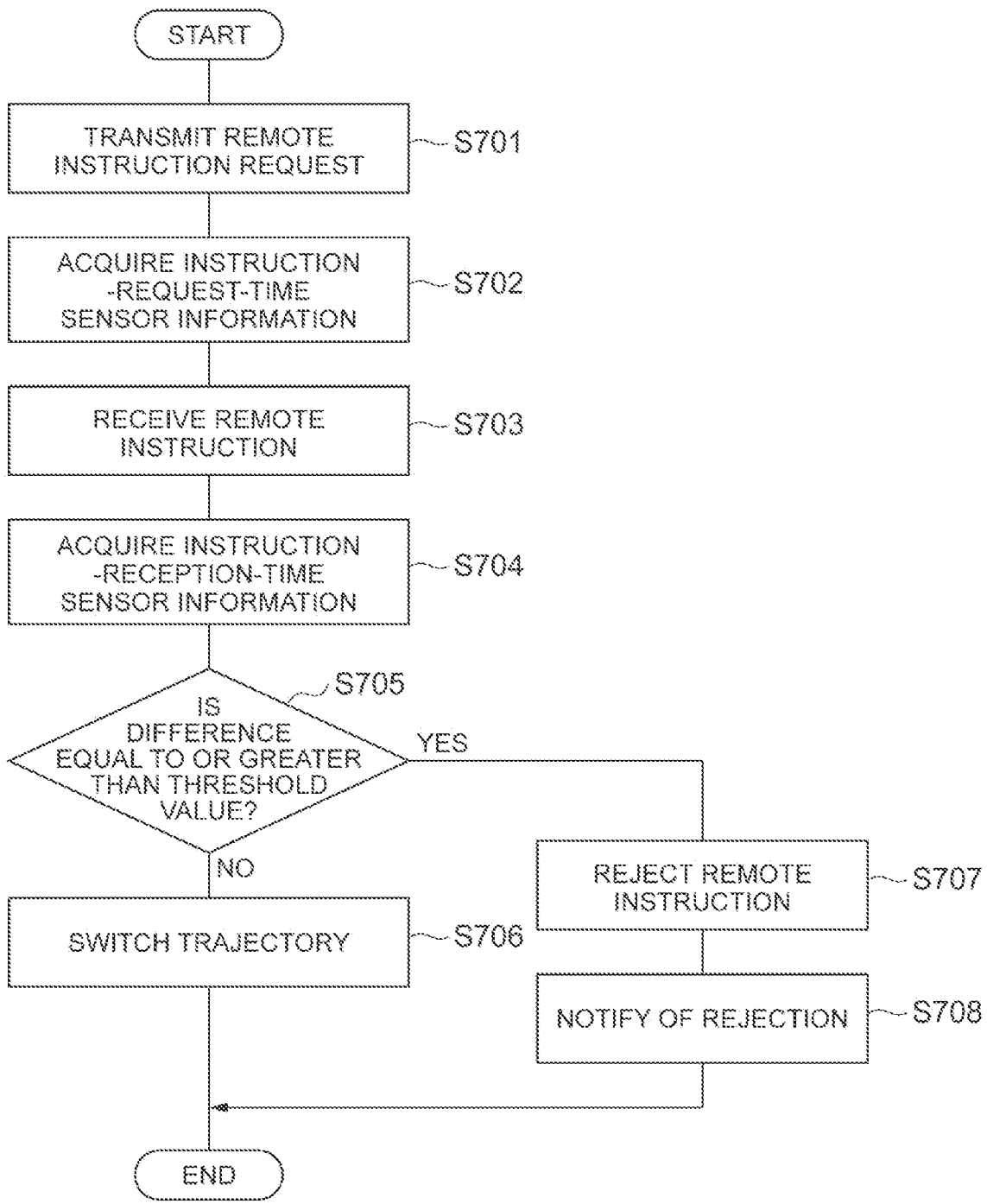
FIG. 16 is a flowchart illustrating an example of remote instruction rejection determination processing performed by the autonomous driving vehicle.

Next, a flow of processing for performing a control in accordance with the received remote instruction or rejecting the remote instruction in the autonomous driving vehicle 2C after making a remote instruction request, will be described. FIG. 16 is a flowchart illustrating an example of remote instruction rejection determination processing performed by the autonomous driving vehicle 2C. The processing illustrated in FIG. 16 is started when the autonomous driving vehicle 2C reaches the remote instruction requested location and the remote instruction request unit 34 determines that the remote instruction request is required.

As illustrated in FIG. 16, if it is determined that the remote instruction request is required, the remote instruction request unit 34 transmits a remote instruction request to the remote instruction apparatus 1B (S701). The request-time sensor information acquisition unit 45 acquires the detection information by the external sensor 22 at the time when the remote instruction reception unit 36 transmits the remote instruction request, as the instruction request-time sensor information (S702). The remote instruction reception unit 36 receives the remote instruction transmitted from the remote instruction apparatus 1B (S703). The reception-time sensor information acquisition unit 44 acquires the detection information detected by the external sensor 22 at the time when the remote instruction reception unit 36 receives the remote instruction from the remote instruction apparatus 1B, as the as the instruction reception-time sensor information (S704).

The delay determination unit 39C determines whether the communication delay is present or not based on whether or not the difference between the instruction request-time sensor information and the instruction reception-time sensor information is equal to or greater than the second difference threshold value (S705). The processing in S706 to S708 is the same as the processing in S206 to S208 described using FIG. 6 in the first embodiment, and the detailed description will nor be repeated.

As described above, if the communication delay occurs, the autonomous driving vehicle 2C rejects the remote instruction transmitted from the remote instruction apparatus 1B in response to the remote instruction request. The delay determination unit 39C determines whether a communication delay occurs or not based on the instruction request-time sensor information acquired by the request-time sensor information acquisition unit 45 and the instruction reception-time sensor information acquired by the reception-time sensor information acquisition unit 44. In this case, the vehicle remote instruction system 100C can more appropriately determine whether the communication delay occurs or not based on the instruction request-time sensor information and the instruction reception-time sensor information.

As described above, the embodiments of the present disclosure are described, however, the present disclosure is not limited to the above-described embodiments. The present disclosure can be implemented in various forms including various modifications and improvements based on the knowledge of those skilled in the art including the above-described embodiments.

The determination processing by each of the delay determination units in the first to fourth embodiments may be appropriately combined. For example, the determination processing by the delay determination unit 39 in the first embodiment and the determination processing by the delay determination unit 39B in the third embodiment may be combined. In this case, if it is determined that the delay occurs in these determination processing, the rejection unit may reject the remote instruction. For example, the determination processing by the delay determination unit 39A in the second embodiment and the determination processing by the delay determination unit 39C in the fourth embodiment may be combined. In this case, if it is determined that the delay occurs in these determination processing, the rejection unit may reject the remote instruction.

For example, the vehicle remote instruction system 100 according to the first embodiment may not include the autonomous driving vehicle 2 as the configuration element. In this case, the vehicle remote instruction system 100 corresponds to the remote instruction apparatus 1. The vehicle remote instruction system according to other embodiments may not include the autonomous driving vehicle as the configuration element.

In the vehicle remote instruction system 100 according to the first embodiment, the remote instruction server 10 may determine whether the remote instruction is necessary or not instead of the autonomous driving vehicle 2. In this case, the remote instruction server 10 determines whether or not the autonomous driving vehicle 2 is in a situation in which the remote instruction request is required, based on the detection information by the external sensor 22 acquired from the autonomous driving vehicle 2. If it is determined that the autonomous driving vehicle 2 is in the situation in which the remote instruction request is required, the remote instruction server 10 may transmit a waiting instruction to the autonomous driving vehicle 2 and may request the remote commander R to input the remote instruction. Similarly, in the vehicle remote instruction system according to other embodiments, the remote instruction server may determine whether the remote instruction is necessary or not.

In the vehicle remote instruction system 100 according to the first embodiment, the remote instruction apparatus 1 may be mounted on the vehicle. In this case, the remote commander R is also in the vehicle. The remote instruction server 10 may be a cloud server configured with ECUs of a plurality of vehicles. Similarly, in other embodiments, the remote instruction apparatus be mounted on the vehicle.

What is claimed is:

1. An autonomous driving vehicle that transmits a request for information to a remote assistant and controls travel based on information transmitted from the remote assistant in response to the request for information, the autonomous driving vehicle comprising:
an electronic control unit configured to:
generate a first trajectory being a trajectory of the autonomous driving vehicle, and a second trajectory being a trajectory that differs from the first trajectory at least in terms of a stopping position and is based on the information;
transmit the request for information to the remote assistant before reaching a predetermined position for requesting the information;
cause the autonomous driving vehicle to drive on the first trajectory at least after transmitting the request for information and until the information is received;
determine whether or not a communication delay occurs between the remote assistant and the autonomous driving vehicle; and
cause the autonomous driving vehicle to drive on the second trajectory if the information is received and the electronic control unit determines that the communication delay has not occurred, and maintain the first trajectory if the information is received and the electronic control unit determines that the communication delay has occurred.

2. The autonomous driving vehicle according to claim 1, wherein the electronic control unit is configured to:
acquire an instruction transmission time being a time at which the remote assistant transmits the information;
acquire an instruction reception time being a time at which the autonomous driving vehicle receives the information; and
determine that the communication delay has occurred if a difference between the acquired instruction transmission time and the acquired instruction reception time is equal to or greater than a first threshold value.

3. The autonomous driving vehicle according to claim 1, wherein the electronic control unit is configured to:
acquire a request transmission time being a time at which the autonomous driving vehicle transmits the information to the remote assistant;
acquire an instruction reception time being a time at which the autonomous driving vehicle receives the information; and determine that the communication delay has occurred if a difference between the acquired request transmission time and the acquired instruction reception time is equal to or greater than a second threshold value.

4. The autonomous driving vehicle according to claim 1, wherein the electronic control unit is configured to:
    transmit sensor information of a vehicle-mounted sensor that detects an external environment to the remote assistant;
    acquire, as an instruction transmission-time sensor information, the sensor information received by a remote instruction device operated by the remote assistant at a time when the remote assistant transmits the information;
    acquire, as an instruction reception-time sensor information, the sensor information detected by the vehicle-mounted sensor at a time when the autonomous driving vehicle receives the information; and
    determine whether or not the communication delay has occurred based on the acquired instruction transmission-time sensor information and the acquired instruction reception-time sensor information.

5. The autonomous driving vehicle according to claim 1, wherein the electronic control unit is configured to:
    acquire, as instruction request-time sensor information, sensor information detected by a vehicle-mounted sensor that detects an external environment of the autonomous driving vehicle at a time when the autonomous driving vehicle transmits the request for information;
    acquire, as instruction reception-time sensor information, the sensor information detected by the vehicle-mounted sensor at a time when the autonomous driving vehicle receives the information; and
    determine whether or not the communication delay has occurred based on the acquired instruction request-time sensor information and the acquired instruction reception-time sensor information.

6. The autonomous driving vehicle according to claim 1, wherein the electronic control unit is configured to:
    generate the first trajectory and the second trajectory if the request for information has been transmitted.

* * * * *